(12) United States Patent
Ono

(10) Patent No.: US 7,505,895 B2
(45) Date of Patent: Mar. 17, 2009

(54) TRANSLATION APPARATUS AND METHOD

(75) Inventor: Kenji Ono, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 478 days.

(21) Appl. No.: 11/433,404

(22) Filed: May 15, 2006

(65) Prior Publication Data
US 2008/0228465 A1      Sep. 18, 2008

Related U.S. Application Data

(62) Division of application No. 10/054,887, filed on Jan. 25, 2002, now Pat. No. 7,080,320.

(30) Foreign Application Priority Data

Jan. 29, 2001    (JP) ............................. 2001-020195

(51) Int. Cl.
*G06F 17/28*    (2006.01)
(52) U.S. Cl. .................... 704/4; 704/2; 704/9
(58) Field of Classification Search .............. 704/4, 704/1, 2, 5, 9, 277; 715/201; 707/3, 9, 531
See application file for complete search history.

(56) References Cited

U.S. PATENT DOCUMENTS

| | | | |
|---|---|---|---|
| 5,828,990 A | | 10/1998 | Nishino et al. |
| 5,924,068 A | * | 7/1999 | Richard et al. .............. 704/260 |
| 6,151,570 A | | 11/2000 | Fuji |
| 6,205,456 B1 | * | 3/2001 | Nakao .......................... 715/201 |
| 6,317,708 B1 | | 11/2001 | Witbrock et al. |
| 6,446,036 B1 | | 9/2002 | Bourbonnais et al. |
| 6,516,296 B1 | | 2/2003 | Fuji |

FOREIGN PATENT DOCUMENTS

| | | |
|---|---|---|
| JP | 6-68144 | 3/1994 |
| JP | 2000-268034 | 9/2000 |

OTHER PUBLICATIONS

Takehyiko Yoshimi, et al., "Improvement of Translation Quality of English Newspaper Headlines by Automatic Preediting". MT Summit VII, Sep. 1999, pp. 496-500, (with corresponding reference JP 2000-268034).

Ichiko Sata, Improvement of Translation Quality of English Newspaper Headlines by Automatic Preediting:, MT summit VII Sep. 1999, pp. 496-500.

M. Hatada, :Article Segmentation of Internet Delivery News Using Nerual Network, vol. 40, No. 4, Apr. 1999, pp. 1831-1939, (with English Abstract).

* cited by examiner

*Primary Examiner*—Huyen X. Vo
(74) *Attorney, Agent, or Firm*—Oblon, Spivak, McClelland, Maier & Neustadt, P.C.

(57) ABSTRACT

A translation apparatus translates article information in a first language including an article body and a related headline as a summary of the article body. A decision unit discriminately identifies the article body and the headline in the article information. A translation unit respectively translates the article body and the headline into a second language based on identification result of the decision unit.

13 Claims, 20 Drawing Sheets

| | | | |
|---|---|---|---|
| (1) | "行使" | (24) | 計画（両性名詞） |
| (2) | "行使" | (25) | 言う |
| (3) | "買い戻す"（サ行5段活用） | (26) | 述べる（下1段活用） |
| (4) | "買い戻す" | (27) | ストック |
| (5) | 買い戻す（サ行5段活用） | (28) | 株（名詞） |
| (6) | 承認（両性名詞） | | |
| (7) | 計画（両性名詞） | | |
| (8) | 買い戻す（サ行5段活用） | | |
| (9) | 普通株（名詞） | | |
| (10) | 買い戻し（両性名詞） | | |
| (11) | 買い戻す（サ行5段活用） | | |
| (12) | 買い戻し（両性名詞） | | |
| (13) | 買い戻す（サ行5段活用） | | |
| (14) | 相殺（両性名詞） | | |
| (15) | 行使（両性名詞） | | |
| (16) | 従業員（名詞） | | |
| (17) | 株式オプション（名詞） | | |
| (18) | 希薄（形容詞） | | |
| (19) | ボード | | |
| (20) | 取締役会（名詞） | | |
| (21) | 買う | | |
| (22) | 買い戻す（サ行5段活用） | | |
| (23) | プログラム | | |

『プログラム』がキャッピ・シテッティ/AACのその獲得に先立って適所にあった、類似した『プログラム』を交換する、とそれは月曜日に『言っ』た。

FIG.15A

『計画』がキャッピ・シテッティ/AACのその獲得に先立って適所にあった、類似した『計画』を交換する、とそれは月曜日に『述べ』た。

FIG.15B

| (1) | 「ディー○○」 |
| (2) | 「ウァ○○・ディー○○社」 |
| (3) | 「ストック」 |
| (4) | 「株」 |
| (5) | 「ボード」 |
| (6) | 「取締役会」 |

FiG.16

| PLOは、ガザーエリコ弾圧での90人のアラビア人を逮捕する。 |

FIG.17A

| PLO、ガザーエリコ弾圧での90人のアラビア人を逮捕 |

FiG.17B

| 見る人に新しい力を提供する対話型のtv |

FIG.17C

| 対話型のtv、見る人に新しい力を提供 |

FIG.17D

| インドの1994/95のGDPは、5.3％-Sharma上昇するのを見られた。 |

FIG.17E

| インドの1994/95のGDP、5.3％上昇する見通し－シャルマ大統領 |

FIG.17F

| チェチェン矛盾はcis頂上を暗くするかもしれない。 |

FIG.17G

| チェチェン矛盾、cisサミットを暗くする可能性 |

FIG.17H

| (1) | (サ変名詞) |
| (2) | 「は」 |
| (3) | 「する」 |
| (4) | 「は」,「が」 |
| (5) | 「頂上」 |
| (6) | 「サミット」 |

FIG.18

HKMAは、HK銀行業務--アナリスト--の十分なコントロールに近づいている。

TRANSLATION APPARATUS AND METHOD

CROSS-REFERENCE TO RELATED APPLICATIONS

This application is a divisional of U.S. patent application Ser. No. 10/054,887, filed Jan. 25, 2002, now U.S. Pat. No. 7,080,320, which is based upon and claims the benefit of priority from the prior Japanese Patent Application No. 2001-20195, filed on Jan. 29, 2001; the entire contents of each of which are incorporated herein by reference.

FIELD OF THE INVENTION

The present invention relates to a translation apparatus and a method for correctly translating a headline in newspaper article.

BACKGROUND OF THE INVENTION

Recently, machine translation software is widely utilized in order for a user to read Web page on the Internet. For example, in case of reading a Web page of on line-news reporting a trend of foreign countries in real time, the machine translation software is utilized. In general, the Web page of on line-news includes a headline and an article body. The headline represents a summary of the article body. The Web page is described in a first language (For example, English) and the machine translation software automatically translates the Web page into second language (For example, Japanese). The user whose native tongue is the second language reads the Web page after the machine translation. In this case, before the user reads translated sentences of the article body, he often reads a translated headline in order to decide whether to read the article body or not. Accordingly, translation of the headline is more important than translation of the article body.

However, in this news article (For example, English article), new proper nouns not registered in a translation dictionary are often used and a style of the English article is unique. Accordingly, machine translation is difficult. Especially, the headline (a title of the article) is fragmentally described on the assumption of background knowledge of an English-speaking people. Accordingly, machine translation of the headline is extremely difficult.

As mentioned-above, the style of news article headline is unique and its machine translation is quite difficult.

SUMMARY OF THE INVENTION

It is an object of the present invention to provide a translation apparatus and a method to correctly translate a headline in a news article.

According to the present invention, there is provided a translation apparatus for translating machine readable article information of a first language including an article body and a headline as a summary of the article body, comprising: a decision unit configured to discriminately decide the article body and the headline in the article information; and a translation unit configured to respectively translate the article body and the headline into a second language based on the decision result of said decision unit.

Further in accordance with the present invention, there is also provided a translation method for translating machine readable article information of a first language including an article body and a headline as a summary of the article body, comprising: discriminately deciding the article body and the headline in the article information; and respectively translating the article body and the headline into a second language based on the decision result.

Further in accordance with the present invention, there is also provided a computer program product, comprising: a computer readable program code embodied in said product for causing a computer to translate article information of a first language including an article body and a headline as a summary of the article body, said computer readable program code having: a first program code to discriminately decide the article body and the headline in the article information; and a second program code to respectively translate the article body and the headline into a second language based on the decision result.

BRIEF DESCRIPTION OF THE DRAWINGS

FIGS. 12A and 12B are schematic diagrams of target word information in Japanese.

FIG. 13 is a schematic diagram of target words in Japanese.

FIGS. 14A-14D are schematic diagrams of target word information in Japanese.

FIGS. 15A and 15B are schematic diagrams of target word information in Japanese.

FIG. 16 is a schematic diagram of target words in Japanese.

FIGS. 17A-17H are schematic diagrams of target word information in Japanese.

FIG. 18 is a schematic diagram of target words in Japanese.

FIGS. 19A and 19B are schematic diagrams of target word information in Japanese.

DETAILED DESCRIPTION OF THE EMBODIMENTS

Figure 1:
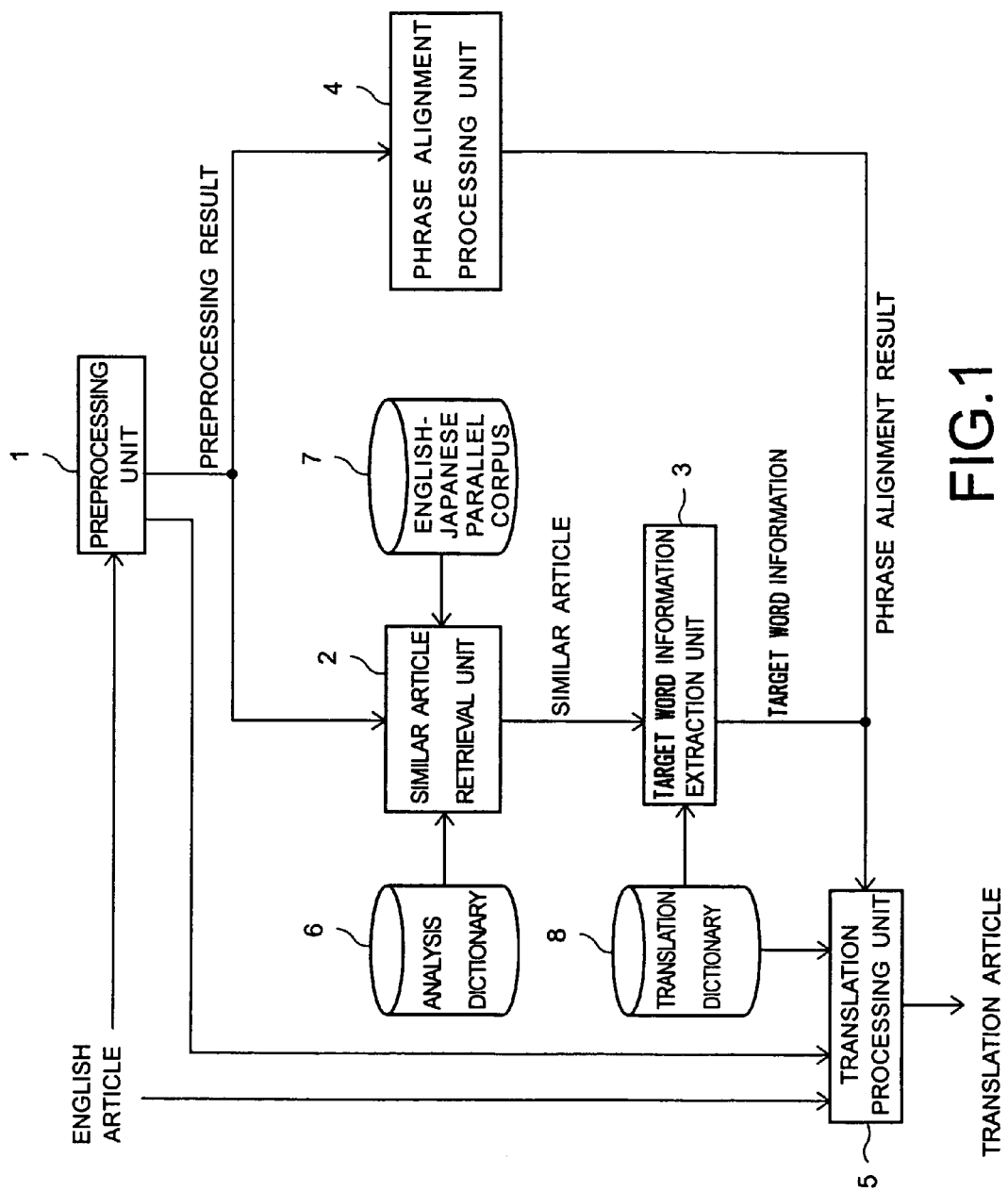
FIG. 1 is a block diagram of the translation apparatus according to one embodiment of the present invention.

Hereinafter, various embodiments of the present invention will be explained by referring to the drawings. FIG. 1 is a block diagram of the translation apparatus according to one embodiment of the present invention. In FIG. 1, an apparatus for translating an English article into a Japanese article is shown as an example. However, the present invention can be applied to translation between any arbitrary two languages.

In the translation apparatus shown in FIG. 1, a headline part and an article body part are respectively extracted from the news article, and each part is exactly translated. In order to accomplish this purpose, a component to improve a translation accuracy by using translation method corresponding to classification of the news article, a component to improve the translation accuracy by correct extraction of a noun phrase including an abbreviation and by translation of the noun phrase, and a component to improve the translation accuracy by using suitable translation method for the headline and the article body, are prepared. These components can be respectively utilized as a single unit or free combined units.

In FIG. 1, the translation apparatus includes a recording unit such as a hard disk to store an analysis dictionary 6, an English-Japanese parallel corpus 7, and a translation dictionary 8; a processing unit such as a preprocessing unit 1; a similar article retrieval unit 2; a target word information extraction unit 3; a phrase alignment processing unit 4; and a translation processing unit 5. Each processing unit can be composed by a program.

Figure 2:
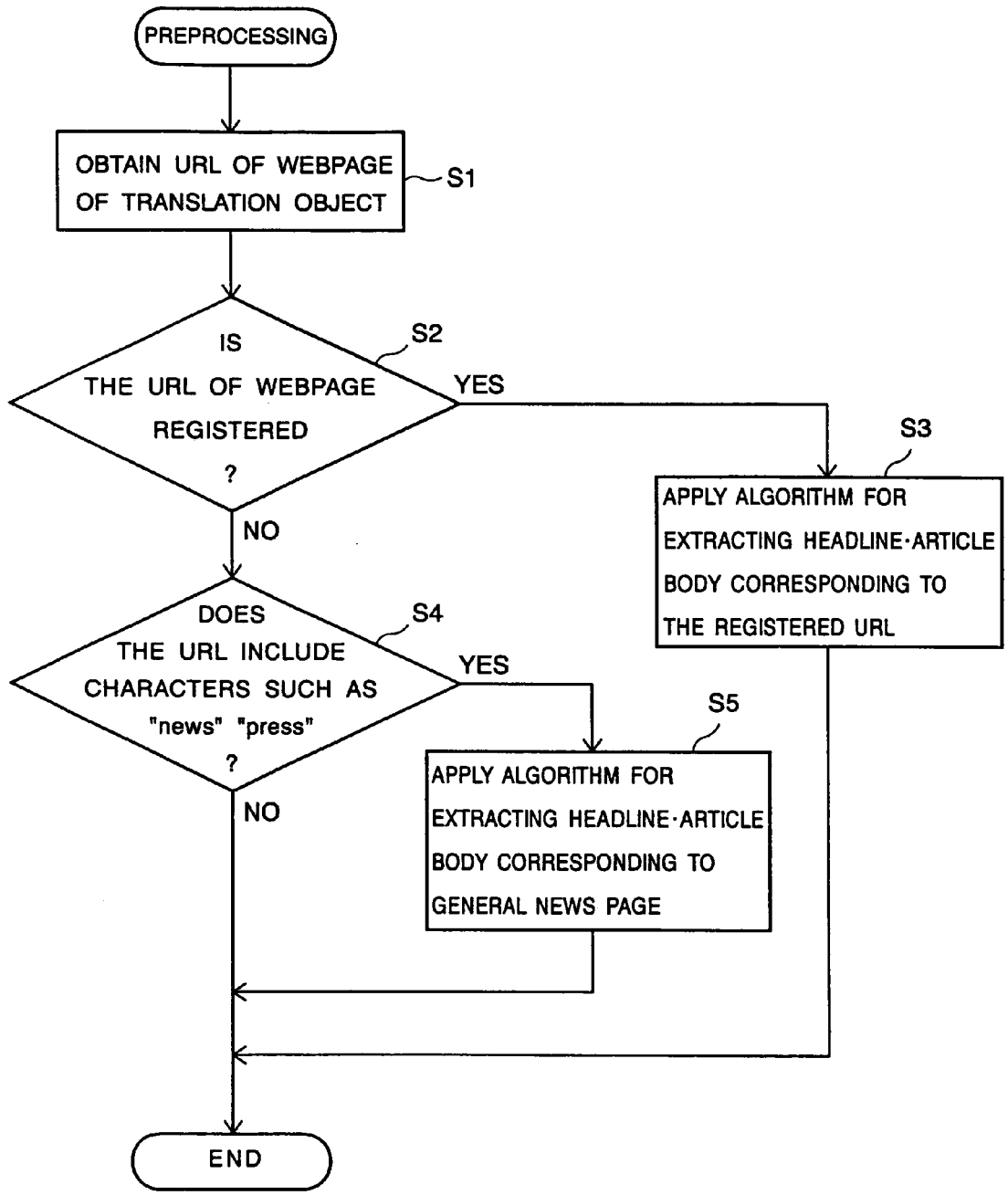
FIG. 2 is a flow chart of decision processing of a preprocessing unit according to one embodiment of the present invention.

First, electronic information of an English article is input to the preprocessing unit 1. The preprocessing unit analyzes the English article as a translation object and identifies the headline and the article body in the English article. FIG. 2 is a flow chart of algorithm to identify the headline and the article body in the preprocessing unit 1. As an example in FIG. 2, the English article: of the translation object is a Web page of a news site. In FIG. 2, the preprocessing unit 1 obtains URL (Uniform Resource Locator) of the Web page of the translation object by checking (S1), and decides whether the Web page is registered as a news site based on the URL (S2). If the Web page is registered as a news site, the preprocessing unit 1 identifies the headline and the article body in the English article by using a decision algorithm corresponding to the news site. Examples of registered URL are represented as follows.

"http://xxxxnews.xxxxx.com/headlines/ts/index.html"
"http://www.xxx.com/"
"http://www.newsxxx.com/"
"http://www.xxtimes.com/"

In this case, as for each registered URL, a decision algorithm of headline/article body corresponding to each Web page is prepared. For example, on a Web page in which the headline is located between two tags <NYT_HEADLINE> and </NYT_HEADLINE>, a position of the headline can be decided by the two tags. Furthermore, on a Web page in which the article body (lead part) is located between two tags <NYT_SUMMARY> and </NYT_SUMMARY>, a position of the article body can be decided. Ordinarily, arrangement of the headline and the body part is prescribed for each news site. Accordingly, the preprocessing unit 1 can respectively extract the headline and the article body by using the decision algorithm corresponding to the prescribed arrangement. If a part of the URL of a news site is different from URL of the same news site, structures of the Web pages of these two news sites are often different. In this case, a decision algorithm of the headline/article body is registered for each URL.

Figure 3A:
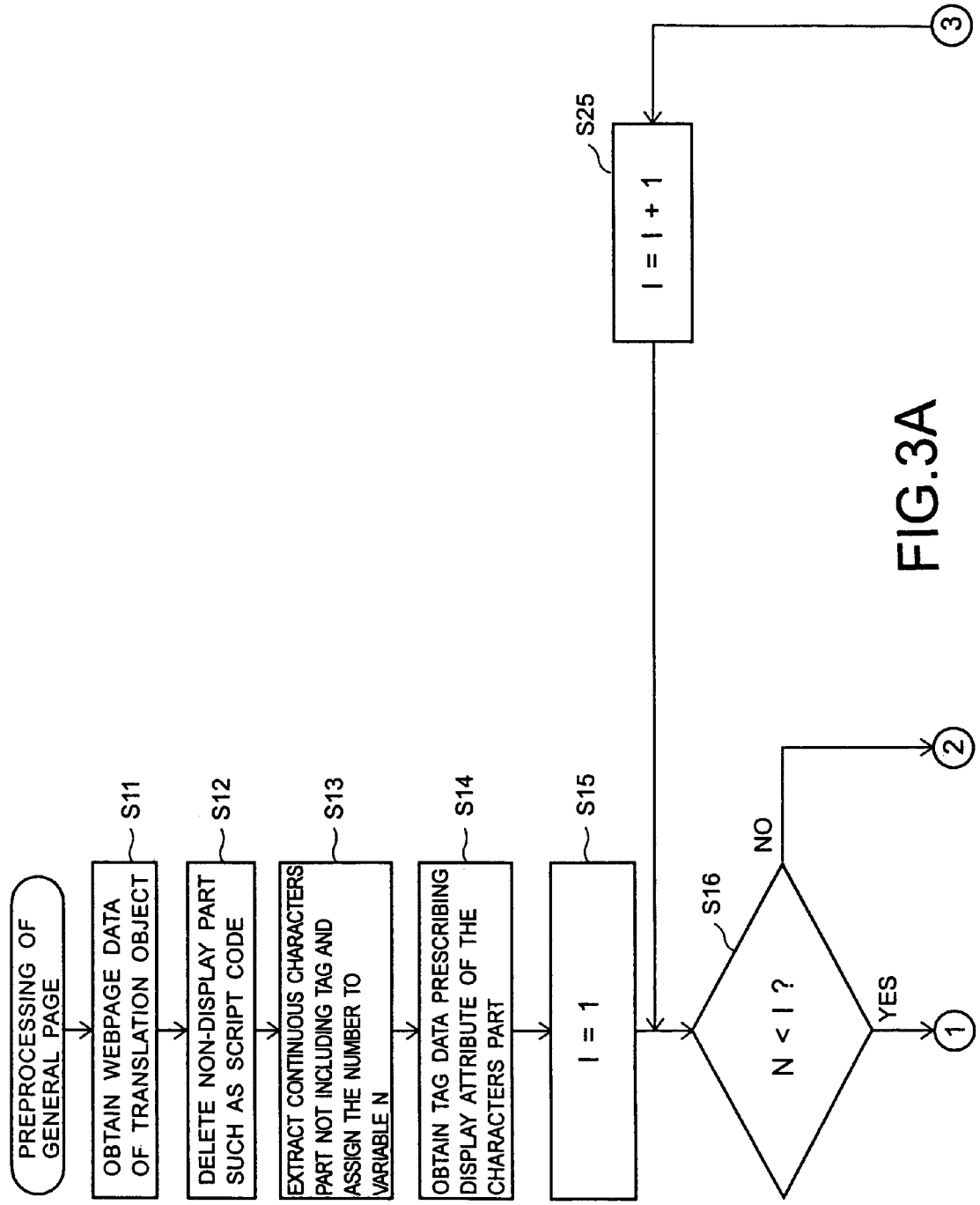
FIGS. 3A and 3B are flow charts of detail processing of S5 in FIG. 2.
Figure 3B:
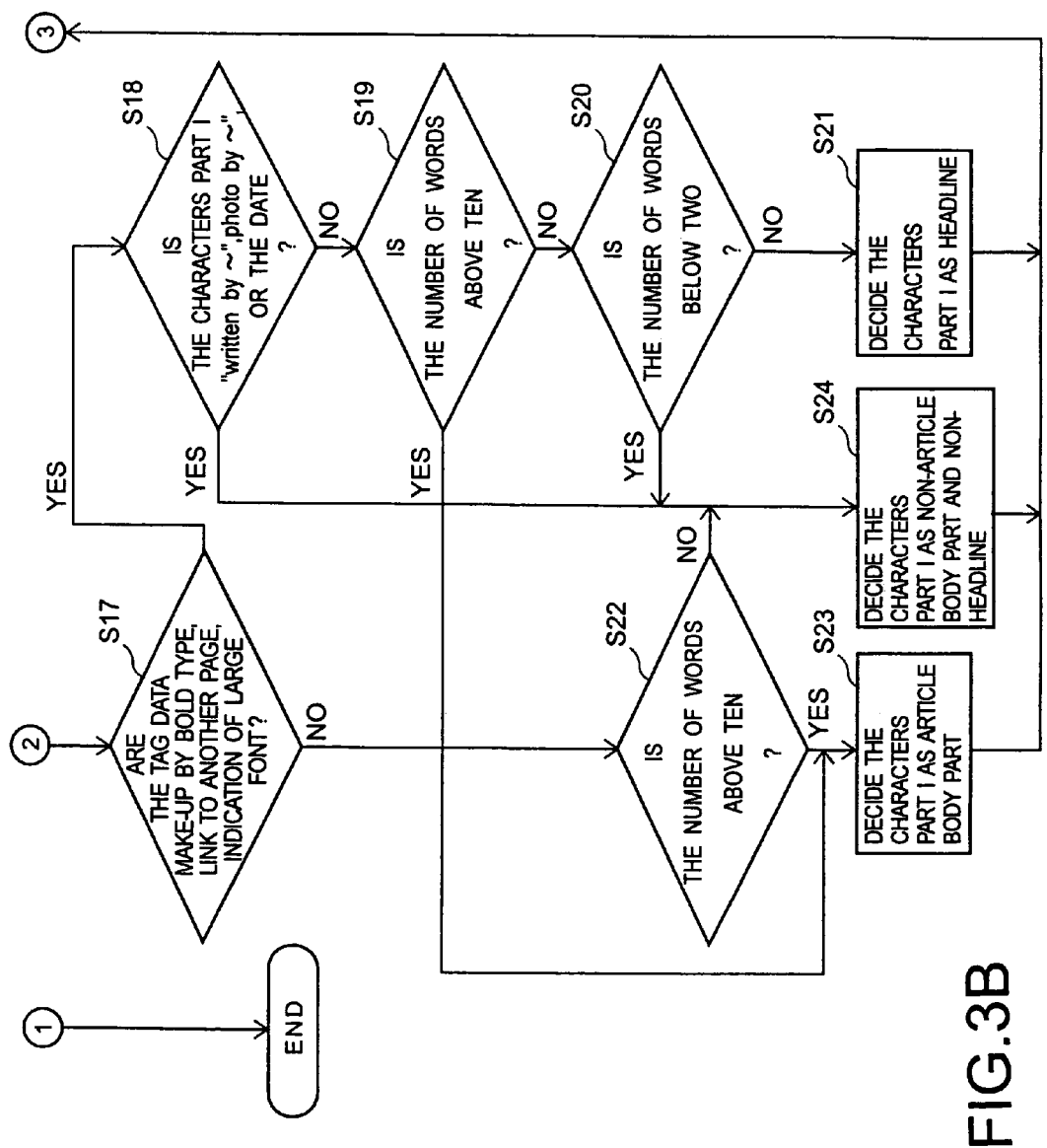

If the URL is not registered, the preprocessing unit 1 decides whether the URL includes characters possible to be news site such as "news" or "press" (S4). If these characters are included in the URL, the Web page is characterized as a news site. By applying a general decision algorithm to the input English article, the preprocessing unit 1 extracts a headline and an article body. FIGS. 3A and 3B are flow charts of the decision algorithm of S5 in FIG. 2. In the decision algorithm of FIGS. 3A and 3B, decision/extraction of the headline and the article body is possible for the news site of unregistered URL.

First, the preprocessing unit 1 obtains electronic information of a Web page of the translation object (S11), deletes any non-display parts such as script code from the Web page (S12), extracts continuous characters not including tags from the Web page, and assigns the number of the characters part (the unit number of words) to variable N (S13). Next, the preprocessing unit 1 obtains tag data prescribing display attributes of the characters part (S14). The preprocessing unit 1 assigns "1" to variable I (S15) and decides whether "N" is smaller than "1" (S16). If "N" is smaller than "1", the processing is completed. If "N" is larger than "1", the preprocessing unit 1 decides whether the attribute of characters part is the same as attribute used for headline (S17). For example, the preprocessing unit 1 decides whether the characters of decision object is in bold type, linked to another page, or indicated as a large size font in comparison with other parts. The headline in the article is ordinarily displayed by a bold type or a font larger than a font of article body, and a predetermined tag is often used. Furthermore, the headline is sometimes HTML (Hyper Text Markup Language) linked to detail page in the article body. Accordingly, the preprocessing unit 1 regards the decision of S17 as one standard to decide the headline. However, the bold font is often used for a writer name and a date. Accordingly, if the preprocessing unit 1 decides as the font often used for the headline, second decision of S18 is further executed. The preprocessing unit 1 decides whether the characters part I of decision object is often used for a part except for the headline (S18). For example, the characters part is decided to include "Written by . . . " or "Photo by . . . ", and decided to be the numerical values of the date. Furthermore, the preprocessing unit 1 decides a headline part by utilizing a limit of the number of words for the headline part. In short, the preprocessing unit 1 decides the number of words (S19, S20). For example, even if the characters part is in bold type or HTML linked, the character part is not often the headline in case that the characters part is consisted of below several words. Conversely, in case that the characters part consists of too many words, the characters part is probably not the headline. The preprocessing unit 1 identifies a headline if the number of words is above three and below ten (S19, 20, 21). Furthermore, if the character part is decided as a part except for the headline (S17), the preprocessing unit 1 can decide whether the character part is the article body or the other part by counting the number of words (S22). In short, if the number of words is above ten, the character part is decided as the article body (S23). If the number of words is below ten, the character part is decided as the other part (S24). Furthermore, if the character part is decided as a part except for the headline (S18, 19), the preprocessing unit 1 decides whether the characters part is the article body or some other part (S24). After decision of S21, 23, 24, the preprocessing unit 1 increments I by "1" (S25) and repeats the processing from S16 for the next character part.

As for decision methods of the headline and the article body, various methods can be considered. For example, the headline is often positioned at head of a page or <HEAD> part of HTML document. By utilizing this position rule, the headline part can be identified. In short, by utilizing these various decision standards, the headline and the article body, of which decision accuracy is lower than of FIG. 2, can be identified.

If an English article as a translation object is an SGML (Standard Generalized Markup Language) or an XML (extendable Markup Language) document, the preprocessing unit 1 can easily identify the headline and the article body by referring to the tag code. Furthermore, even if an English article as a translation object is a word processor document or a text document that does not include tag data or attribute data, characters close to a head part of the article, which is not a writer's name, a place name, or a date are identified as a headline of the article, and characters following the headline are identified as the article body. By utilizing this heuristics, the headline can be automatically decided to some extent. To identify, the writer name or the place name, morphological analysis may be utilized. Furthermore, in case of not identifying the headline and the article body, by displaying candidates of headline, the headline and the article body may be decided by indication input of the user.

As shown in FIG. 1, the preprocessing result of the preprocessing unit 1 is supplied to the similar article retrieval unit 2, the phrase alignment processing unit 4, and the translation processing unit 5. In the present embodiment, by utilizing the preprocessing result, translation part can be discriminated and translated based on classification of news article by the similar article retrieval unit 2 and the target word information extraction unit 3. In addition to this, a noun phrase can be correctly extracted and translated by the phrase alignment unit 4, and the headline and the article body can be suitably translated by the translation processing unit 5.

The target words based on classification of the news article are obtained by the similar article retrieval unit 2 and the target word information extraction unit 3. First, by using a word vector as a processing result of the preprocessing unit 1, the similar article retrieval unit 2 retrieves an article similar to the English article as a translation object from English articles of English-Japanese parallel corpus 7. The English-Japanese parallel corpus 7 is a database which registers each English article and corresponding translation (Japanese) articles. The Japanese article, which is of good quality with assistance, is desirable. An abridged translation of the English article may be registered if extraction processing of target word information (mentioned later) can be executed.

The analysis dictionary 6 correspondingly stores a headword of an English word, a part of speech, the plural form, the abbreviation form, and the conjugation form. This information is utilized for morphological analysis processing of the similar article retrieval unit 2, i.e., morphological analysis of English article of translation object and English articles stored in the English-Japanese parallel corpus. The content of the analysis dictionary 6 is duplicated for the English-Japanese dictionary of the translation dictionary 8. Accordingly, the translation dictionary 8 can substitute for the analysis dictionary 6.

Figure 4:
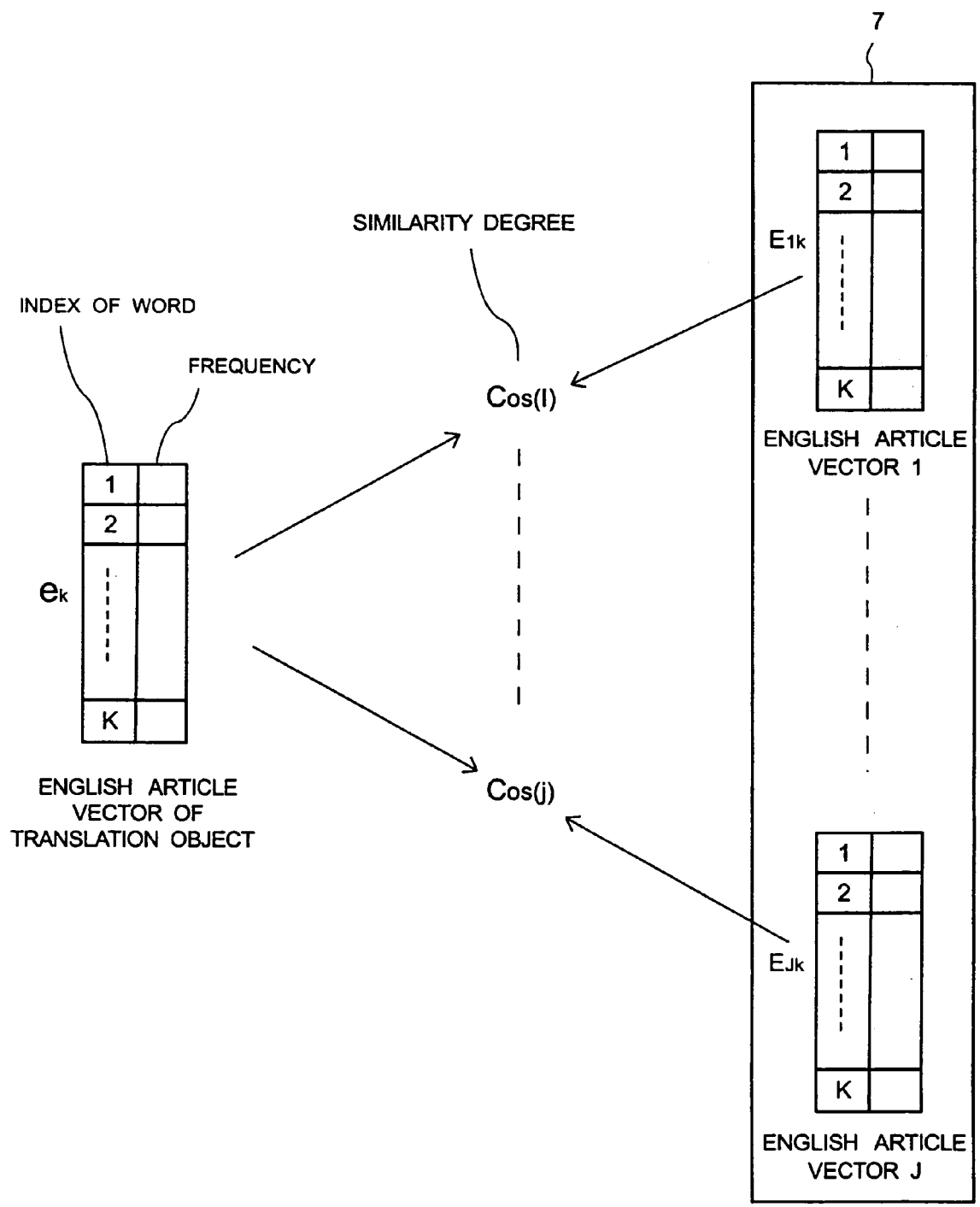
FIG. 4 is a schematic diagram of a calculation method of similarity degree between article of translation object and each of a plurality of stored articles.

The similar article retrieval unit 2 retrieves an article similar to English article of translation object from English-Japanese parallel corpus 7 by following steps from (a) to (f). FIG. 4 is a schematic diagram of the calculation method of similarity degree between the English article of translation object and each of a plurality of English articles stored in the English-Japanese parallel corpus 7.

(a) The headline and the article body are morphologically analyzed using the analysis dictionary 6. Each word is extracted from the headline and the article body.

(b) Appearance frequency of each word is calculated in an article (the headline and the article body). A vector, of which the stem of a word is dimension and the frequency of the word is dimensional value, is created for the article. An index of the dimension (each word) is represented as "k" and the vector of each English article is represented as "ek".

(c) As for each English article in the English-Japanese parallel corpus 7, similar processing of steps (a) (b) is executed. In this case, an index of article number is represented as "j", an index of the dimension (each word) is represented as "k", and a vector of each article is represented as "Ejk".

(d) A similarity degree between the article of translation object and each article in the English-Japanese parallel corpus 7 is calculated as inner product between two article vectors as shown in FIG. 4. The similarity degree between the English article of translation object and each English article j in the English-Japanese parallel corpus 7 is calculated by the following equation (1).

$$c_{os(j)} = \frac{\sum_{k=1}^{K} e_k E_{jk}}{\sqrt{\sum_{k=1}^{K} e_k^2 \times \sum_{k=1}^{K} E_{jk}^2}} \quad (1)$$

(e) Each pair of English article and Japanese (translation) article in English-Japanese parallel corpus 7 is sorted in order of higher similarity degree. If a similarity degree is below a threshold, a pair including the English article of the similarity degree is excluded.

(f) A predetermined number of pairs of English article and Japanese article are selected in order of higher similarity degree, and output as the similar article.

In short, the similar article retrieval unit 2 identifies an English article having a high similarity degree in the English-Japanese parallel corpus 7 as an article similar to the English article as a translation object. This processing (article alignment technique) of the similar article retrieval unit 2 is disclosed in the following references (1), (2), and (3), the contents of which are herein incorporated by reference.

(1) Collier, N. Kumano, A., Hikrakawa, H. "English-Japanese news article alignment form the internet using MT", Japan SOC. For AI annual meeting, 1998.

(2) Collier, N., Hirakawa, H., Kumano, A. "Machine Translation vs. Dictionary Term Translation—a comparison for English-Japanese news article alignment", COLING-ACL—1998.

(3) Collier, N., Hirakawa, H., Kumano, A. "Creating a noisy parallel corpus from newswire articles using multilingual information retrieval", Transactions of J. SOC. Information Processing, 1999.

The processing of step (c) may be previously executed and the processing result (word vector of each English article) may be stored in the English-Japanese parallel corpus 7. In this case, the high speed processing can be executed, and necessary memory capacity can be reduced because English article body is not stored in the English-Japanese parallel corpus 7.

In case of decision of the similarity degree, the similar article retrieval unit 2 lowers the weight of proper nouns, dates and quantities. The retrieved similar article is used for extracting the target word. The retrieved similar article is not necessarily an article related to the same affair described in the English article as a translation object. It is sufficient that a type of the affair (such as a fire, or a purchase of a company) of the retrieved article is similar to the English article as a translation object. In other words, it is not necessary that information such as who, what, where, and how represented by proper nouns, dates, and quantities in the retrieved article is similar to the English article as a translation object. Accordingly, the weights of those words are lowered in case of decision of the similarity degree. Conversely, if these weights are not lowered, sufficient number of similar articles cannot be retrieved from the English-Japanese parallel corpus 7, and the extraction processing of target word information (explained afterwards) cannot be suitably executed.

Furthermore, instead of word extraction by morphological analysis at steps (a), (b), and (c), the stem of the English word may be extracted by using heuristic rule called "Porter algorithm" and utilized as the word. This processing is called "stemming" and can be executed at high speed without the dictionary. The Porter algorithm is disclosed in the following reference, the contents of which are herein incorporated by reference.

(4) Porter, M. F., "An Algorithm For Sumx stripping,", Program 14 (3), July 1980, pp. 130-137.

Furthermore, the weights of the proper noun (a word from which starts by capital letter), the date, and quantities such as an amount of money, are lowered at steps (b), (c). However, weights of words in the headline and a head paragraph (lead) part of the article may be large in comparison with words in the article body.

Figure 5A:
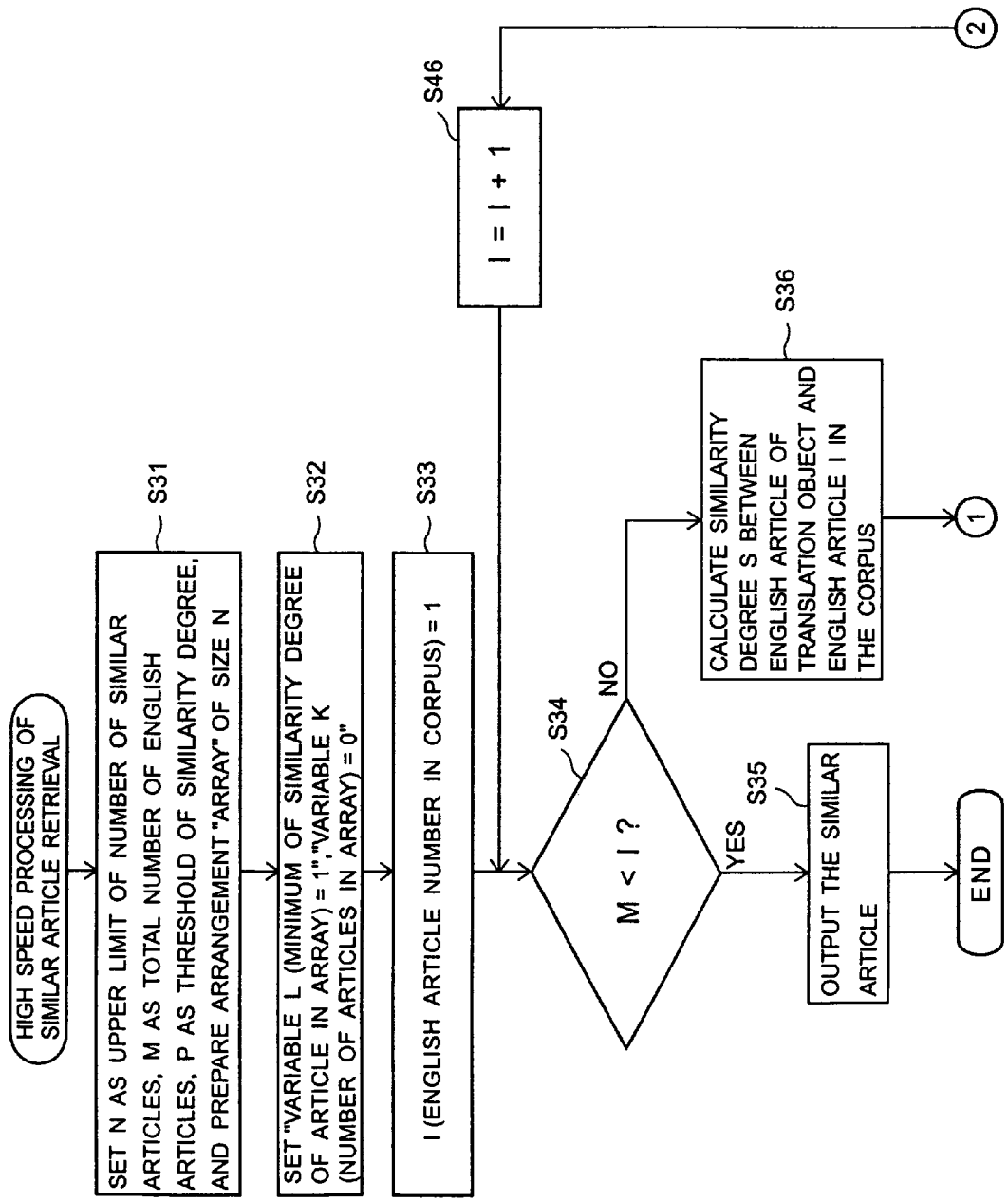
FIGS. 5A and 5B are flow charts of high speed algorithm of similar article-retrieval processing.
Figure 5B:
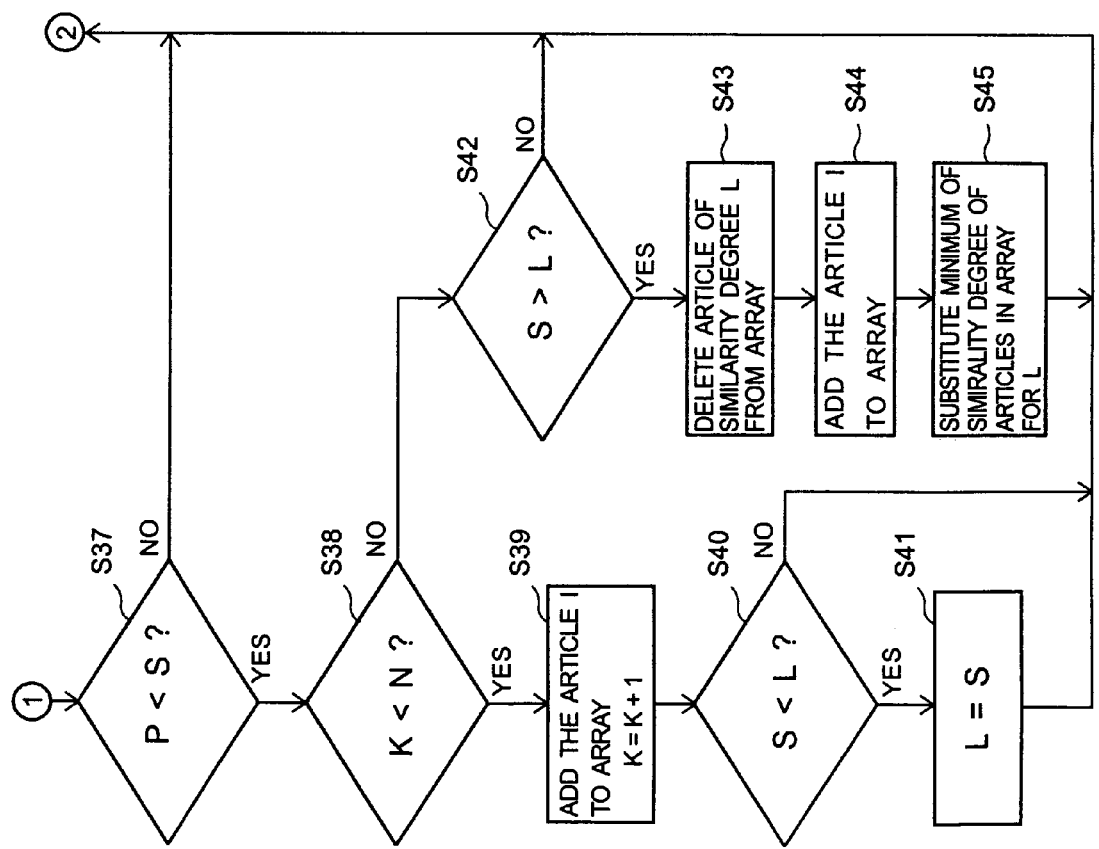

FIGS. 5A and 5B are flow charts of a high speed algorithm of processing of steps (d), (e), and (f). In the algorithm of FIGS. 5A and 5B, in case of calculating the similarity degree of each article in the English-Japanese parallel corpus 7 at step (d), a predetermined number of articles of which the similarity degree is in order of higher are updately stored at each timing. In this case, the memory capacity necessary for processing is greatly reduced, and high speed processing can be accomplished without sorting processing of step (e).

In FIGS. 5A and 5B, assume that an upper limit of the number of similar articles output from the similar article retrieval unit 2 is N, a total number of English articles in the English-Japanese parallel corpus 7 is M, and a threshold of the similarity degree is P. An arrangement "ARRAY" of which size is N is prepared (S31). Next, a variable L (minimum of similarity degree of articles in ARRAY) is set by "1" and a variable K (the number of articles in ARRAY) is set by "0" (S32). The English article number I in the English-Japanese parallel corpus 7 is initialized by "1" (S33). The similar article retrieval unit 2 decides whether retrieval processing of similar article is executed for all English articles in the English-Japanese parallel corpus 7 (S34). The similar article retrieval unit 2 calculates the similarity degree S between English article of translation object and English article I in the English-Japanese parallel corpus 7 by the inner product of article vectors calculated at above-mentioned steps (a), (b), and (c). Then, the similar article retrieval unit 2 decides whether the similarity degree S is above a threshold P (S37). If the similarity degree S is not above the threshold P, the English article I is decided as non-similar article and the processing is forwarded to S46. The processing following from S34 are repeated for the next English article (I+1). If the similarity degree S is above the threshold S (S36), the similar article retrieval unit 2 decides whether the number K of articles in the arrangement ARRAY is over the size N (S38). If the number K is not over the size N, the English article I is added to the arrangement ARRAY, and the number K of articles is incremented by "1" (S39).

Next, the similar article retrieval unit 2 decides whether the similarity degree S is below the minimum L of similarity degree of English articles in the arrangement ARRAY (S40). If the similarity degree S is not below the minimum L, the processing is forwarded to S46. If the similarity degree S is below the minimum L, the similarity degree S is assigned to the minimum L (S41) and the processing forwarded to S46. If the number K of articles in the arrangement ARRAY is over the size N (S38), the similar article retrieval unit 2 decides whether the similarity degree S is above the minimum L of similarity degree of articles in the arrangement. ARRAY (S42). If the similarity degree S is not above the minimum L, the processing is forwarded to S46 and processing is executed for the next article. If the similarity degree S is above the minimum L, the similar article retrieval unit 2 deletes the article of the minimum L from the arrangement ARRAY (S43), adds the article I to the arrangement ARRAY (S44), and substitutes a new minimum of similarity degrees of articles in the arrangement ARRAY for the minimum L (S45). The processing is forward to S46 and similar processing is repeated for the next article.

When the similar article retrieval unit 2 decides that the retrieval of the similarity degree is executed for all English articles in the English-Japanese parallel corpus 7 (S34), the similar articles in the arrangement ARRAY are output (S35). In this way, the similarity degree is calculated for each article, and the unit number K of English articles, arranged according to the highest similarity degree, are stored in the arrangement ARRAY. Accordingly, memory capacity necessary for the processing is reduced and high speed processing is executed without sorting.

The electronic information of the similar article is supplied to the target word information extraction unit 3. The target word information extraction unit 3 extracts the English word and the target word from the similar English article and the Japanese (translation) article detected by the similar article retrieval unit 2. In short, as the target words of each word in the English article input to the preprocessing unit 1, Japanese words in the Japanese article corresponding to the similar English article are utilized. In this case, the target word information extraction unit 3 detects a Japanese word to which the English word is translated from the similar English article and corresponding Japanese article, and outputs the Japanese word as the target word information.

The translation dictionary includes an English-Japanese dictionary and a Japanese-English dictionary. The English-Japanese dictionary correspondingly includes a headword of an English word, a part of speech, a plural form, a conjugation form, and the target word (Japanese). The Japanese-English dictionary correspondingly includes a headword of a Japanese word, a part of speech, a conjugation form, and the target word (English). The target word information extraction unit 3 utilizes the English-Japanese dictionary in the translation dictionary 8 in order to obtain the English word from the similar English article and obtain the target word (Japanese) candidates. Furthermore, the target word information extraction unit 3 utilizes the Japanese-English dictionary of the translation dictionary 8 in order to obtain the Japanese word from the Japanese article corresponding to the similar English article and obtain the target word (English) candidates. The translation processing unit 5 executes translation by referring to the English-Japanese dictionary in the translation dictionary 8.

Figure 6:
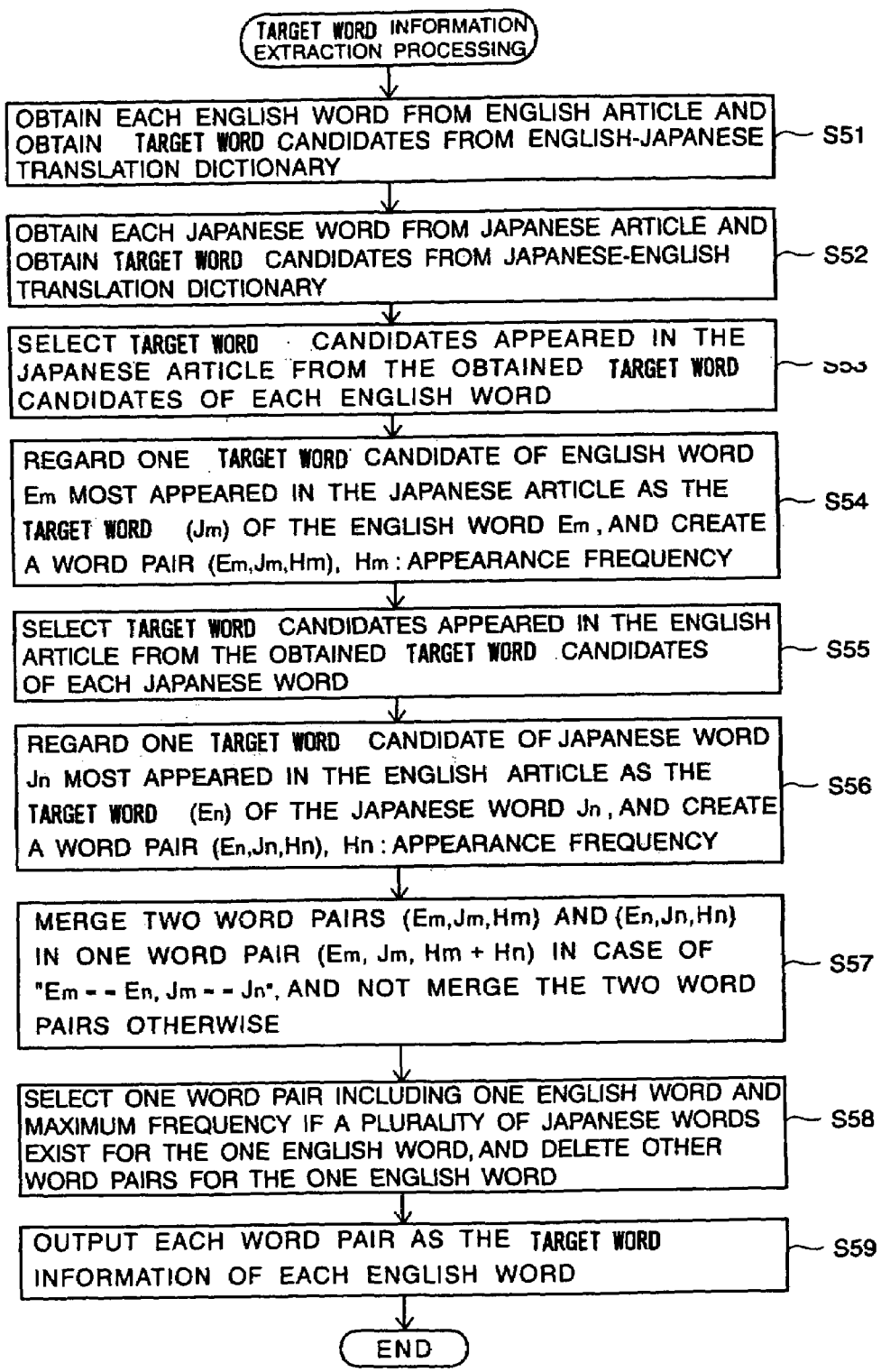
FIG. 6 is a flow chart of processing of target word information processing unit according to one embodiment of the present invention.

FIG. 6 is a flow chart of processing of the target word information extraction unit 3. The target word information extraction unit 3 utilizes the translation dictionary 8 including English-Japanese dictionary and Japanese-English dictionary. First, the target word information extraction unit 3 obtains each English word of the similar English article and obtains the equivalent candidate (Japanese word) from the English-Japanese dictionary in the translation dictionary 8 (S51). Next, the target word information extraction unit 3 obtains each Japanese word of the Japanese article corresponding to the similar English article and obtains the target word candidate (English word) from the Japanese-English dictionary in the translation dictionary 8 (S52). Next, the target word information extraction unit 3 selects a target word candidate (Japanese word) appearing in the Japanese article from the target word candidates corresponding to each English word of the similar English article (S53). As for the selected target word candidates corresponding to the English word Em, the target word information extraction unit 3 regards the target word candidate appearing the most often in the Japanese article as the Japanese target word Jm of the English word Em, and creates a set (Em, Jm, Hm) consisting of the English word Em, the Japanese target word Jm, and the appearance frequency Hm (S54). Next, the target word information extraction unit 3 selects the target word candidate (English word) appearing in the similar English article from the target word candidates corresponding to each Japanese word of the Japanese article (S55). As for the selected target word candidates corresponding to the Japanese word Jn, the target word information extraction unit 3 regards the target word candidate appearing the most often in the similar English article as the English target word En of the Japanese word Jn, and creates a set (En, Jn, Hn) consisting of the English target word En, the Japanese word Jn, and the appearance frequency Hn (S56).

In this way, a correspondence between each English word in the English article and a Japanese target word in the Japanese article is estimated. Next, the target word information extraction unit 3 merges the two word pairs (Em, Jm, Hm), (En, Jn, Hn) (S57). In short, the target word information unit 3 merges the two pairs of which "Em=En, Jm=Jn" to one word pair (Em, Jm, Hm+Hn). If a plurality of Japanese words (different Japanese target words) exist for one English word, the target word information extraction unit 3 selects the word pair including the English word and the maximum frequency, and deletes other word pairs including that English word (S58). Last, the target word information extraction unit 3 outputs each word pair as the target word information of each English word (S59). In this way, as for the similar English article, the Japanese target word of each English word and the frequency data are obtained as the target word information. By translating the input English article using this target word information (Japanese target word in Japanese article corresponding to the similar English article), translation based on classification of the article can be executed.

As a method for extracting the target word information from the parallel corpus, various methods can be taken into consideration. In the algorithm of FIG. 6, even if an arrangement and structure of sentences in the English article are different from the Japanese article, effective target word information can be obtained. For example, in case of translated article of a newspaper, sentence style and order of description content are often different from an original article in order for native reader to easily read. The algorithm of FIG. 6 is suitable for translation of newspaper article.

As a processing of the target word information extraction unit 3, various modifications can be considered. For example, as one modification example, the preprocessing unit 1 extracts each English word from the English article of translation object, and extracts the target word (Japanese word) of each English word only. This extraction processing of the target word information can be executed at high speed. Furthermore, as another modification example, in case of preprocessing, the English article as a translation object is translated once by the translation processing unit. In this case, the target word of each English word is extracted and output to the target word information extraction unit 3. The extracted target word is set as a default target word of the English word. Then, the target word information unit 3 outputs the target word information excluding the default target word to the translation processing unit 5. In this method, the target word information which contributes to change of the target word is output from the target word information extraction unit 3, and processing of the translation processing unit 5 can be executed at high speed.

In FIG. 1, the phrase alignment processing unit 4 can affect the correct extraction and translation of a noun phrase. For example, as for a company name, even if correct noun phrase (the company name) is described in the article body, a part of the noun phrase is often described in the headline. In short, a shortened expression or an abbreviation is often utilized for the headline. In case of using an ordinary translation dictionary, correct translation is impossible. Accordingly, the phrase alignment unit 4 calculates a similarity degree between a phrase (noun phrase) of the headline and a noun phrase of the article body (especially, a noun phrase of head sentence in the article body), and outputs correspondence information of phrases indicating the same object (phrase alignment result). In this way, the abbreviation in the headline can be correctly translated.

Figure 7:
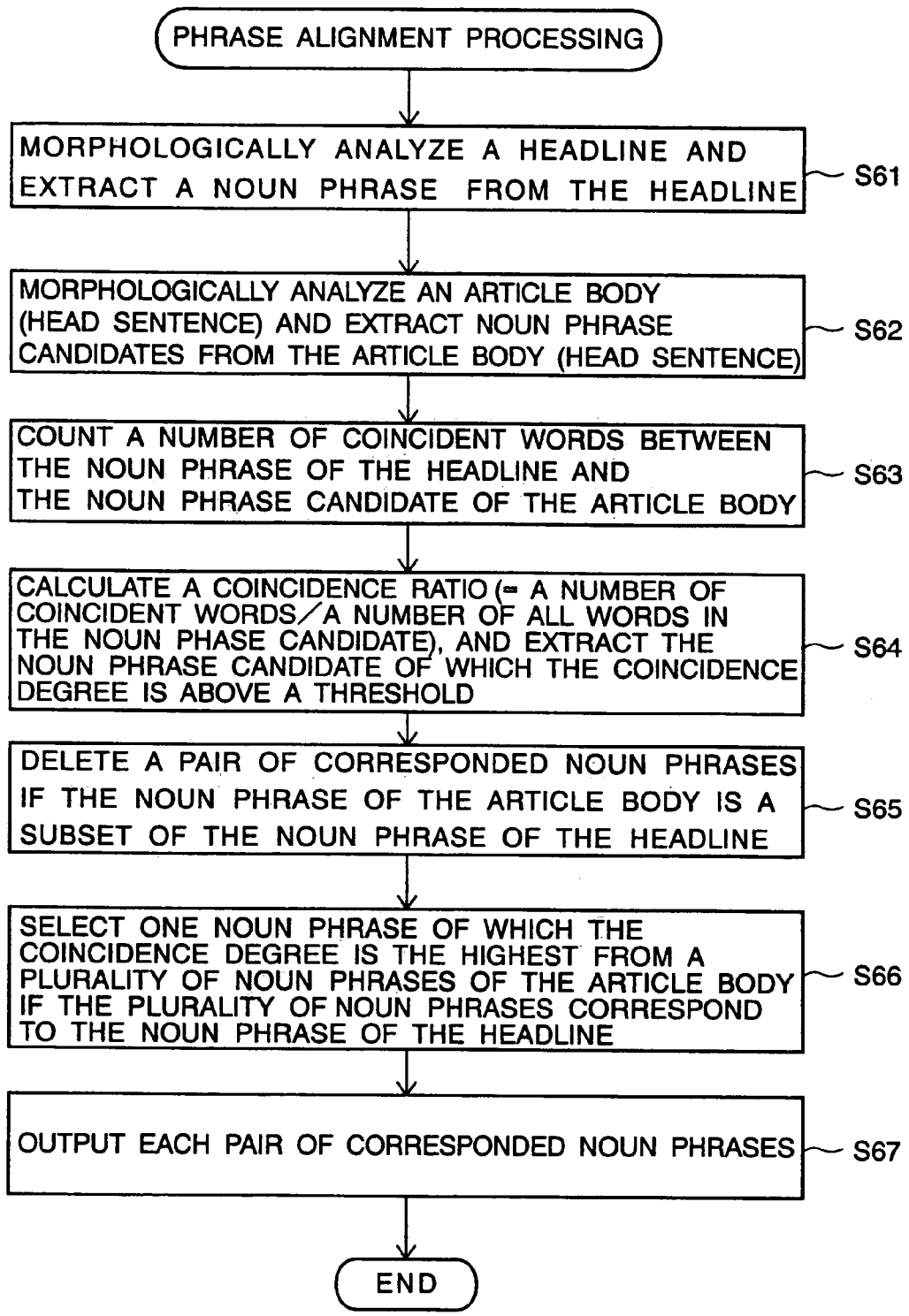
FIG. 7 is a flow chart of processing of a phrase alignment processing unit according to one embodiment of the present invention.

FIG. 7 is a flow chart of algorithm of phrase alignment processing. First, the phrase alignment processing unit 4 morphologically analyzes the headline and the article body (or a head sentence of the article body), and extracts parts of speech satisfying a predetermined condition (For example, the following equation (2)) as a noun phrase candidate (S61, 62). In this case, the phrase alignment processing unit 4 can extract the noun phrase candidate from syntax analysis result. However, extraction from morphological analysis result can be executed at high speed. The phrase alignment processing unit 4 previously describes a condition of candidate extraction of parts of speech by regular expression. The following equation (2) represents one example of the condition.

$$\text{"article?(noun/adjective)*noun"} \qquad (2)$$

In the equation (2), "?" represents omission of part of speech locating just before, "(○/□)" represents "○" or "□", and "*" represents at least one time of repeat of part of speech locating just before (In the equation (2), a noun or an adjective). Next, the phrase alignment processing unit 4 extracts a noun phrase candidate corresponding to the noun phrase of the headline from the article body, especially a head sentence of the article body (S63, 64). In this case, as for all combinations of each noun phrase candidate of the headline and each noun phrase candidate of the article body, the phrase alignment processing unit 4 detects coincidence of words (obtained from morphological analysis) in each combination (S63). If a coincidence degree (the number of coincident words/the number of all words in the noun phrase candidate) between two noun phrase candidates of one combination is above a predetermined threshold, the phrase alignment processing unit 4 extracts the two noun phrase candidates as mutual corresponding noun phrases (S64). For example, if a noun phrase of the headline consists of three words, if a noun phrase candidate of the article body consists of five words, and if two words in the noun phrase of the headline coincide with two words in the noun phrase candidate of the article body, then the coincidence ratio is "2/5". If the threshold is "1/3", the noun phrase of the headline and the noun phrase candidate of the article body are extracted as the same one.

However, if the number of words of a noun phrase in the headline is larger than the number of words of a noun phrase in the article body, i.e., if the noun phrase in the article body is a subset of the noun phrase of the headline, the noun phrase in the headline is better for the translation. Accordingly, the phrase alignment processing unit 4 deletes a pair of two noun phrases extracted at step S64 (S65). For example, assume that a noun phrase in the headline is "S. Korean/ship/fire", and a corresponding noun phrase in the article body is "S. Korean/ship/fire" or "ship/fire". In short, the noun phrase in the article body is the same as or one part of the noun phrase in the headline. In this case, if the noun phrase in the headline is replaced by the noun phrase in the article body according to the phrase alignment result and used for translation, original information of the noun phrase in the headline is lost. Accordingly, such pair of two noun phrases is deleted at step S65.

Furthermore, as a noun phrase in the article body corresponding to a noun phrase in the headline, for example, a plurality of different noun phrases (such as different abbreviation methods) are often used. Accordingly, if a plurality of noun phrases in the article body are extracted for one noun phrase in the headline at step S64, the phrase alignment processing unit 4 extracts a noun phrase of which the coincidence degree is the highest from the plurality of noun phrases as a corresponding noun phrase (S66). Last, the phrase alignment processing unit 4 outputs a pair of two corresponded noun phrases (S67). In case of comparison of the noun phrase, the phrase alignment processing unit 4 utilizes a headword of the dictionary instead of appearance form of each word in the article. However, as for an unknown word, the phrase alignment processing unit 4 utilizes the appearance form. Furthermore, the headline often includes many abbreviation expressions. Accordingly, the original headword of the dictionary replaces an abbreviation in the headline and is utilized for comparison with the article body. For example, if the headline includes expressions "mln" and "bln", the headword "million" "billion" of the dictionary are utilized for comparison with the article body.

Figure 8:
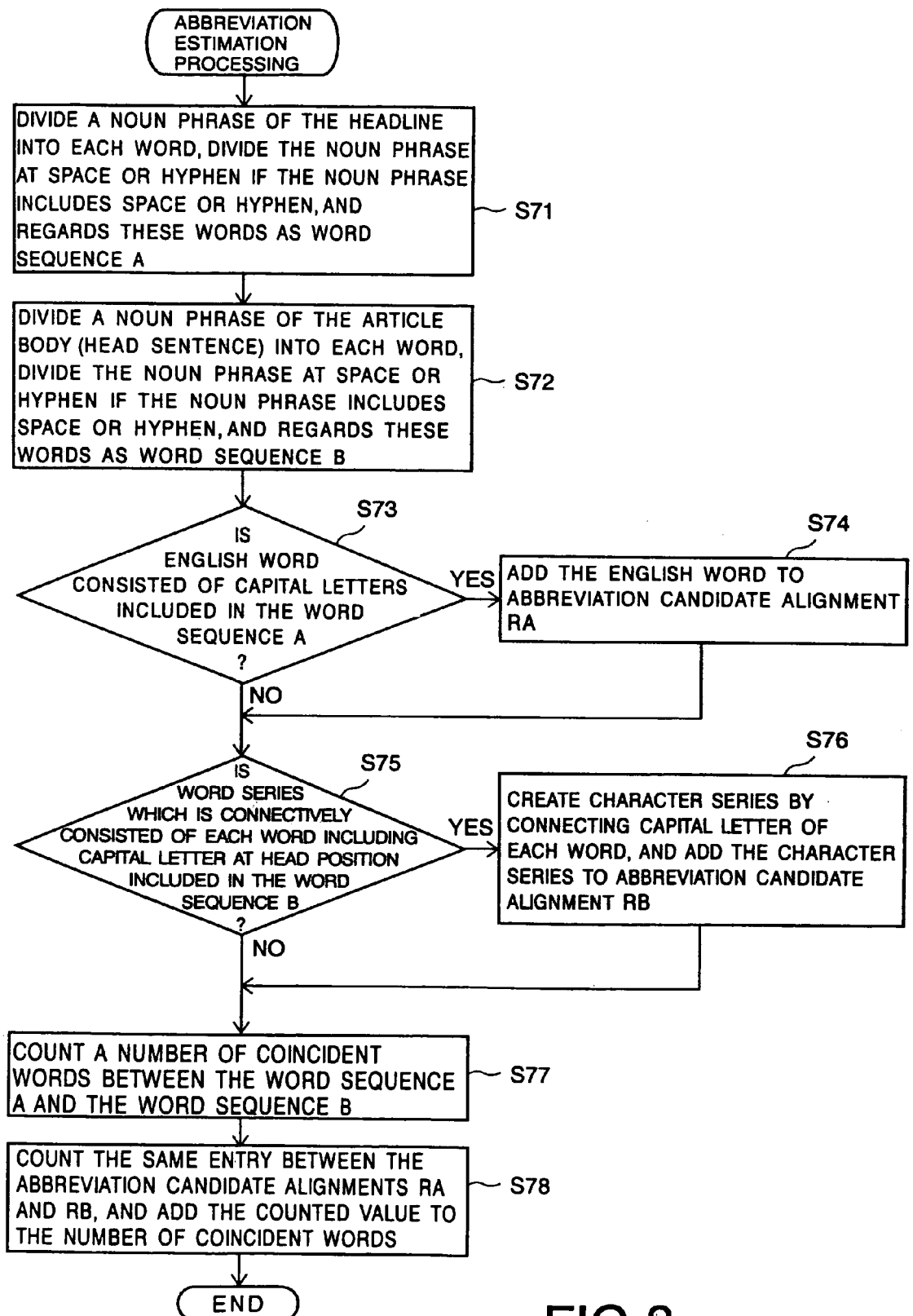
FIG. 8 is a flow chart of abbreviation estimation processing of the phrase alignment processing unit according to one embodiment of the present invention.

In the coincidence detection at step S63, the phrase alignment processing unit 4 uses an algorithm shown in FIG. 8. FIG. 8 is a flow chart of abbreviation estimation processing in case that the headline includes an abbreviated expression. For example, if an unknown word "HKMA" appears in the headline and a noun phrase "Hong Kong/Monetary Authority" appears in the article body, the unknown word is decided to correspond to the noun phrase. In this case, "/" represents a word pause, and characters from "/" to next "/" represent the entry of the dictionary.

First, the phrase alignment processing unit 4 divides a noun phrase of the headline into separate words (S71). As the noun phrase, the abbreviation is described alone or described by connecting to other words. At step S71, if the noun phrase of the headline includes a space or a hyphen, the phrase alignment processing unit 4 divides the noun phrase at a position of the space or the hyphen. The divided words are regarded as a word sequence A. The phrase alignment processing unit 4 divides the noun phrase of the article body (or the head sentence in the article body) into separate words (S72). The divided words are regarded as a word sequence B.

Next, the phrase alignment processing unit 4 decides whether at least one English word in the word sequence A has only capital letters only (S73). If at least one English word consists of only capital letters, this English word is added to an abbreviation candidate arrangement RA (S74). Next, the phrase alignment processing unit 4 decides whether a word series in the word sequence B consists of consecutive words each including a capital letter at the head position (S75). If so, the phrase alignment processing unit 4 creates a character series by connecting the capital letters beginning each word, and adds the character series to an abbreviation candidate alignment RB (S76). The phrase alignment processing unit 4 counts the number of coincident words between the word sequences A and B (S77). This processing is the same processing as step S63 in FIG. 7. Furthermore, an abbreviation in the abbreviation candidate arrangement RA is decided to be the same as original word series of the abbreviation in the abbreviation candidate arrangement RB. Accordingly, the phrase alignment processing unit 4 counts the same entry of the abbreviation between the abbreviation candidate arrangement RA and RB, and adds the counted value to the number of coincident words (S78). In this way, by utilizing the algorithm shown in FIG. 8, a pair of corresponded noun phrases between the headline and the article body can be obtained by considering the abbreviation.

Furthermore, by extending the abbreviation estimation processing in FIG. 8, for example, the phrase alignment processing unit 4 can estimate that the abbreviation "MITI" corresponds to "the Ministry of International Trade and Industry". In this case, the phrase alignment processing unit 4 creates an abbreviation candidate by deleting an article, a conjunction and a preposition located just before capital letter-word or put between two capital letter-words, and adds the abbreviation candidate to the abbreviation candidate arrangement B. Furthermore, for example, if a word "Alexander" is included in the headline and a word "Alexander the Great" is included in the article body, these two words are decided to partially correspond. In short, as for a noun phrase including a space or a hyphen, the noun phrase is divided at the space or the hyphen, and each divided unit is regarded as one noun. In this way, by the phrase alignment processing unit 4, a noun phrase in the headline is replaced by a suitable noun phrase in the article body, and the noun phrase in the headline is correctly translated.

In FIG. 1, the translation processing unit 5 executes translation using the target word information as output result of the target word information extraction unit 3 and the phrase alignment result as output result of the phrase alignment processing unit 4. In short, in case of translating an English word in the English article as a translation object, if the English word is included in the target word information extracted by the target word information extraction unit 3, the translation processing unit 5 give priority to the corresponding Japanese word as the target word. Furthermore, by using the phrase alignment result (correspondence information of noun phrase) from the phrase alignment processing unit 4, the translation processing unit 5 replaces (supplements) a noun phrase fragment in the headline with a corresponding noun phrase in the article body. Furthermore, by using the preprocessing result, the translation processing unit 5 suitably translates the headline and the article body. For example, in case of translating the headline, the translation processing unit translates by applying a translation rule for the headline, for example, the target word is concluded by a substantive.

Next, an operation of the present embodiment is explained. Assume that an article including the following <<English article translation object>> is input.

<<English article translation object>>

Dissss to buy back up to 95 mln shares

BUUBANK, Calif., April 23 (Reete)—Waaa Dissss Co said its board had approved a stock repurchase program of up to 95 million shares.

The program replaces a similar program that was in place prior to its acquisition of Caapii Citti/AAC, it said on Monday.

The preprocessing unit 1 extracts the headline and the article body from the input article. The headline and the article body are supplied to the similar article retrieval unit 2 as the preprocessing result. In above-mentioned <<English article translation object>>, "Dissss to . . . shares" is the headline, and "BUUBANK, . . . Monday." is the article body.

In the English-Japanese parallel corpus 7, a plurality of English articles of various fields and a plurality of Japanese articles as the translation of each English article are correspondingly stored. The similar article retrieval unit 2 morphologically analyzes the English article of translation object and each English article in the English-Japanese parallel corpus 7 by referring to the analysis dictionary 6, generates each word vector of the English article of translation object and each English article, and retrieves one English article similar to the English article of the translation object from the English-Japanese parallel corpus 7. The one English article having the highest similarity degree in the English-Japanese parallel corpus is decided as an article similar to the English article translation object.

Assume that the retrieval result by the similar article retrieval unit 2 is the following <<Retrieval result of similar article>>. In short, the following retrieval result is an example (headline is only shown) of an English article similar to the <<English article translation object>> in English-Japanese parallel corpus 7. The following retrieval results are arranged in order of higher similarity degree.

<<Retrieval result of similar article>>

| SIMILARITY DEGREE | HEADLINE |
| --- | --- |
| 0.582435250282288 | Notwet to buy back up to 2 mln shares |
| 0.574999988079071 | Cisss increases buyback program |
| 0.529697775840759 | Deel Computer increases share buyback |
| 0.505964457988739 | Micoot Inc bought back 164,500 shares |
| 0.464757978916168 | PainWer increases share buyback plan |
| 0.461880236864090 | Gillee sets 10-15 mln share buyback |
| 0.444467127323151 | Campbee heir continues share sale |
| 0.433333337306976 | Texxxa has bought 1.5 mln shrs |
| 0.427617967128754 | AMM to buy back up to 20 mln of its shares |

Following <<similar article>> represents the English article of which the similarity degree is the highest in <<Retrieval result of similar article>> and corresponding translation article in the English-Japanese parallel corpus 7.

Figures 12A, 12B:
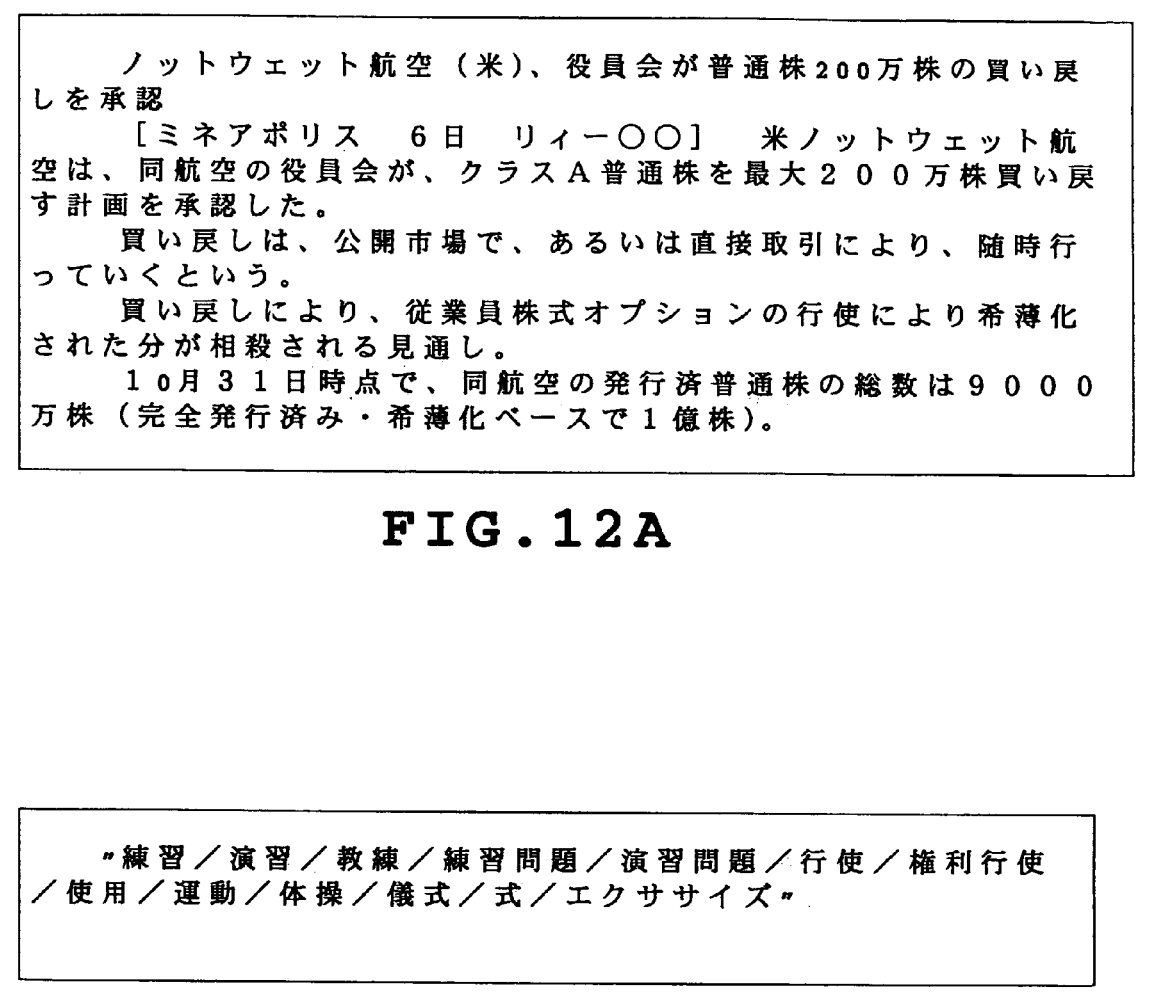

<<similar article>>
<English article>
Notwet to buy back up to 2 mln shares
MINNEAPOLIS, December 6 (Reete)—Notwet Airlines Corp said Friday its board had approved a program to buy back up to two million shares of Class A common stock. The repurchases will occur from time to time in the open market or through negotiated transactions, the airline said. Shares repurchased under the program would offset dilution resulting from the exercise of employee stock options, the company said. As of October 31, Notwet had 90,000,000 common shares outstanding (100,000,000 on a fully distributed and diluted basis), the company said.
<Japanese article>
(See FIG. 12A)
The similar article retrieval unit 2 outputs electrical information of a similar article of which the similarity degree is above a threshold to the target word information extraction unit 3. The target word information extraction unit 3 extracts the target word English words in the similar article by referring to the translation dictionary 8. For example, as for Japanese candidate (the target word) of English word "exercise" in the <English article> of <<similar article>>, the translation dictionary stores (See FIG. 12B). On the other hand, only (See FIG. 13(1)) is included in above-mentioned <Japanese article>. Accordingly, the target word information extraction unit 3 selects (See FIG. 13(2)) as the target word of "exercise". In the same way, as for English candidate (the target word) of Japanese word (See FIG. 13(3)) in the <Japanese article>, the translation dictionary stores "repurchase/redeem/buy". In this case, only "buy" is included in above-mentioned <English article>. Accordingly, the target word information extraction unit 3 selects (See FIG. 13(4)) as the target word of "buy". In this way, the target word information extraction unit 3 selects following <<Target word information>> for above-mentioned <<similar article>>. In the following <<Target word information>>, "( . . . )" represents a part of speech of English, "(n)" represents a noun, "(v)" represents a verb, and "< . . . >" represents a part of speech of Japanese.

<<Target word information>>

| | |
| --- | --- |
| buy(v)→ | (See FIG. 13(5)) |
| approve(v)→ | (See FIG. 13(6)) |
| program(n)→ | (See FIG. 13(7)) |
| buy(v)→ | (See FIG. 13(8)) |
| common stock(n)→ | (See FIG. 13(9)) |
| repurchase(n)→ | (See FIG. 13(10)), (See FIG. 13(11)) |
| repurchase(v)→ | (See FIG. 13(12)), (See FIG. 13(13)) |
| offset(v)→ | (See FIG. 13(14)) |
| exercise(n)→ | (See FIG. 13(15)) |
| employee(n)→ | (See FIG. 13(16)) |
| stock option(n)→ | (See FIG. 13(17)) |
| dilute(v)→ | (See FIG. 13(18)) |

In above-mentioned <<Target word information>>, an extraction example of the target word information for <<similar article>> of which the similarity degree is the highest is explained. However, in the same way, extraction processing of the target word information is actually executed for all similar articles in <<Retrieval result of similar article>>.

On the other hand, the phrase alignment processing unit 4 inputs electronic information of characters of the headline and the article body as the preprocessing unit. The phrase alignment processing unit 4 executes phrase alignment processing for characters of the headline and characters of the article body. First, the phrase alignment processing unit 4 extracts a noun phrase "Dissss", "back up", "95 mln/shares" from the headline. Then, the phrase alignment processing unit 4 extracts a noun phrase "BUUBANK", "Calif", "April/23", "Reete", "Waaa Dissss/Co", "board", "stock/repurchase/program", "95 million/shares" from a head sentence of the article body. In these noun phrases, a combination of two noun phrases commonly including the same word is "Dissss" and "Waaa Dissss/Co", "95 mln/shares" and "95 million/shares". As mentioned-above, in case of calculating the coincidence degree by considering the headword including a space or a hyphen, the former is 33% (⅓) and the latter is 100% (⅗). In this case, "mln" is regarded as "million" but deleted because "95 million/shares" is a subset (the same as) of "95 mln/shares". Assume that a threshold at step S64 in FIG. 7 is 30%. The phrase alignment processing unit 4 outputs the following <<Phrase alignment result>>.

<<Phrase alignment result>>
Dissss→Waaa Dissss/Co

The above-mentioned <<Target word information>> and <<Phrase alignment result>> are supplied to the translation processing unit 5. The translation processing unit 5 executes a translation by using not only English-Japanese dictionary of the translation dictionary 8 but also <<Target word information>> and <<Phrase alignment result>>. Following <<Used target word>> represents the target word information used by the translation processing unit 5 for translation of <<English article of translation object>> in the target word information extracted by the target word information extraction unit 3. In this case, following <<Used target word>> contributes to change of general target word stored in the English-Japanese dictionary. Concretely, as for target word of English word at the left edge, a general target word based on the translation dictionary 8 shown at the left side of an arrow (→) is changed to a special target word at the right side of the arrow. "( ... )" represents a part of speech of English, "(n)" represents a noun, "(v)" represents a verb, and "< ... >" represents a part of speech of Japanese.

<<Used target word>>

| board(n) | (See FIG. 13(19)) → (See FIG. 13(20)) |
| buy(v) | (See FIG. 13(21)) → (See FIG. 13(22)) |
| program(n) | (See FIG. 13(23)) → (See FIG. 13(24)) |
| say(v) | (See FIG. 13(25)) → (See FIG. 13(26)) |
| stock(n) | (See FIG. 13(27)) → (See FIG. 13(28)) |

Following <<Translation result>> represents translated article of <<English article translation object>> by using the above-mentioned <<Used target word>> and <<Phrase alignment result>>. In the following <<Translation result>>, in order to compare with a case not using <<Target word information>> (<<Used target word>>) and <<Phrase alignment result>>, an ordinary translation result (<Prior translation>) using the translation dictionary 8 only and a special translation result (<Application translation>) using <<Target word information>> and <<Phrase alignment result>> are shown by unit of one sentence. Furthermore, different part between <Prior translation> and <Application translation> is marked up by "[ ]".

<<Translation result>>
Headline: Dissss to buy back up to 95 mln shares
<Prior translation>: (See FIG. 14A)
<Application translation>: (See FIG. 14B)
Original sentence 1: BUUBANK, Calif., April 23 (Reete)—Waaa Dissss Co said its board had approved
a stock repurchase program of up to 95 million shares.
<Prior translation>: (See FIG. 14C)
<Application translation>: (See FIG. 14D)
Original sentence 2: The program replaces a similar program that was in place prior to its acquisition of
Caapii Citti/AAC, it said on Monday.
<Prior translation>: (See FIG. 15A)
<Application translation>: (See FIG. 15B)

As shown in the above-mentioned <<Translation result>>, in the headline, (See FIG. 16(1)) of <Prior translation> is changed to (See FIG. 16(2)) of <Application translation> as more exact company name. In the article body, as for the equivalent of "stock", (See FIG. 16(3)) of <Prior translation> is changed to (See FIG. 16(4)) of <Application translation>. As for the target word of "board", (See FIG. 16(5)) of <Prior translation> is changed to (See FIG. 16(6)) of <Application translation>. As a whole, suitable target words are used. Furthermore, by utilizing the target word information, the target word of the headline is expected to be improved.

The style of English headline is unique, and a suitable translation sentence is not often obtained by regular translation. Accordingly, the translation processing unit 5 prepares a translation rule for the headline's exclusive use, and applies the translation rule in case of translating the headline only. Following <<Headline application translation>> represents a special translation result (<Application translation>) using the translation rule for the headline's exclusive use and an ordinary translation result (<Prior translation>) for original sentences R1~R4.

<<Headline application translation>>
Original sentence R1: PLO arrests 90 Arabs in Gaza-Jericho crackdown
<Prior translation>: (See FIG. 17A)
<Application translation>: (See FIG. 17B)
Original sentence R2: Interactive tv to offer viewers new powers
<Prior translation>: (See FIG. 17C)
<Application translation>: (See FIG. 17D)
Original sentence R3: Indian 1994/95 GDP seen rising 5.3 pct—Sharma
<Prior translation>: (See FIG. 17B)
<Application translation>: (See FIG. 17F)
Original sentence R4: Chechen conflict may overshadow CIS summit
<Prior translation>: (See FIG. 17G)
<Application translation>: (See FIG. 17H)

The example of original sentence R1 is applicable example of substantive conclusion rule. In case that a verb at the end of a sentence is (See FIG. 18(1)), a subject particle (See FIG. 18(2)) is changed to「,」except for (See FIG. 18(3)) at the end of a sentence. In case that an object of the verb is not included in the sentence, if the subject particle (See FIG. 18(4)) is changed to「,」, the translated sentence becomes unnatural. Accordingly, in this case, the substantive conclusion rule is not applied.

The example of original sentence R2 is applicable example of translation rule of "to". By using this rule, order of the target words becomes more natural in the translation sentence.

The example of original sentence R3 is applicable example of translation rule of "seen".

The example of original sentence R4 is applicable example of translation rule of "may".

In this way, by applying the translation rule for the headline's exclusive use, the translation sentence becomes more natural. In this case, if this translation rule is applied to the article body, the translation sentence of the article body becomes conversely unnatural. Accordingly, it is necessary that the headline and the article body are decided by the preprocessing and the translation rule is applied to the headline only.

In the above-mentioned example of original sentence R3, a change of the target word of "Sharma" is based on information source processing of news explained afterwards. Furthermore, in the example of original sentence R4, a change from (See FIG. 18(5)) to (See FIG. 18(6)) of the target word of "summit" is based on the target word information from the target word information extraction unit 3.

In the above-mentioned example, translation processing of one article was explained. However, if one document includes a plurality of articles, after the headline and the article body are extracted from each article, the similar article retrieval processing, the target word information extraction processing, the phrase alignment processing, and the translation processing are executed for each article.

In the headline of English news, information source of the news is often shown at the end of the sentence. If such a headline is translated by ordinary method, correct translation result cannot be often obtained. Accordingly, it is decided whether a word at the end of the headline is information source of news by referring to a head sentence of the article body. If the word at the end of the headline is the information source, a translation method by dividing the headline at the word is applied. In this processing, both the headline and the head sentence of the article body are referred. Accordingly, the phrase alignment processing unit 4 preferably executes this processing in parallel with the phrase alignment processing.

Figure 9:
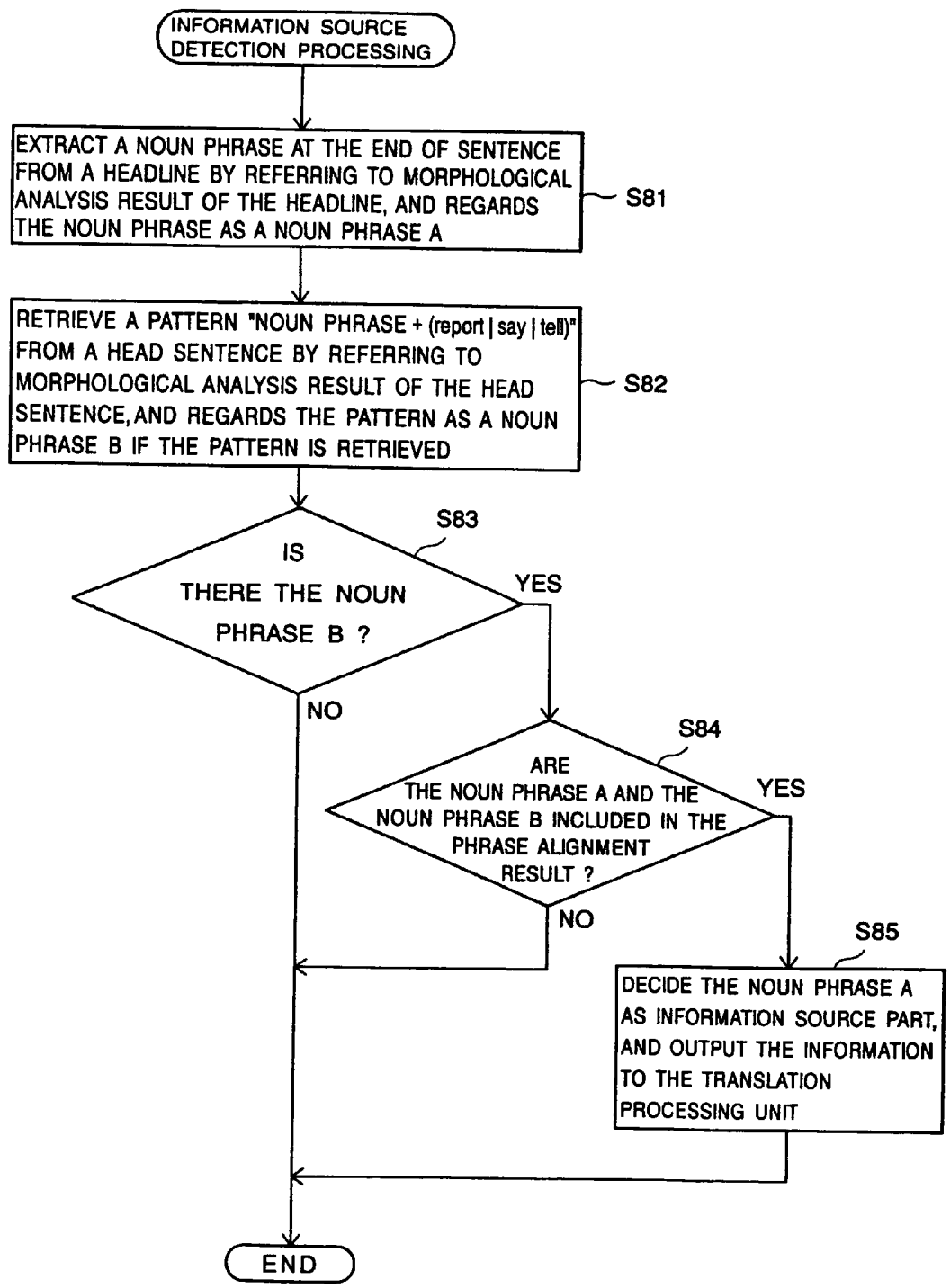
FIG. 9 is a flow chart of information source-detection processing for news article according to one embodiment of the present invention.

FIG. 9 is a flow chart of an algorithm for information source processing. First, the phrase alignment processing unit 4 extracts a noun phrase at the end of a sentence from the headline based on morphological analysis result of the headline, and regards this noun phrase as noun phrase A (S81). Next, the phrase alignment processing unit 4 extracts a subject of verb (For example, "report", "say", "tell") typically used as expression of information source from the head sentence of the article body (S82). In short, a pattern "noun phrase+("report" or "say" or "tell")" is compared with morphological analysis sequence of the head sentence. In case of coincidence, a coincident pattern in the head sentence is regarded as a noun phrase B. The form of these verbs may be the past form, the present form, or the perfect form. Next, the phrase alignment processing unit 4 decides whether the noun phrase B exists (already extracted from the head sentence) (S83). In case of existence of the noun phrase B, the phrase alignment processing unit 4 decides whether the noun phrases A and B are included in the phrase alignment result (S84). In this case, the phrase alignment result used at step S84 is obtained without execution of Step S65 in FIG. 7. In short, the noun phrase in the article body may be a subset of (or the same as) the noun of the headline. If the noun phrase A and B are included in the phrase alignment result, the phrase alignment processing unit 4 decides that the noun phrase A is the information source part, and outputs the information to the translation processing unit 5.

In the following <<Processing result of news information source>>, in case that the phrase alignment processing unit 4 decides the information source part using a verb representing the news information source, translation result (<Application translation>) of the translation processing unit 5 is shown. In addition to this, an ordinary translation result (<Prior translation>) not using the news source detection processing result is shown.

<<Processing result of news information source>>

Headline: HKMA nearing full control of HK banking—analysts

Head sentence of article body: HONG KONG, February 10 (Reete)—The Hong Kong Monetary Authority (HKMA) will move a step closer to gaining complete control over the colony's banking system if the Banking (Amendment) Bill 1995 passes in late February, analysts said.

<Prior translation>: (See FIG. 19A)

<Application translation>: (See FIG. 19B)

In the above-mentioned <<Processing result of news information source>>, "analysts" at the end of headline represents the information source of article. The reason why this part is the information source is that "analysts said." is located at the end of head sentence of article body. In <Prior translation>, this part is not correctly translated.

By using algorithm shown in FIG. 9, a noun "analysts" in the headline is decided as the information source. Because a word "analysts" is located at the end of the headline, an expression "analysts said" is located at the end of the head sentence of article body, and the same word "analysts" is included in the phrase alignment result between the headline and the head sentence of article body.

The phrase alignment processing unit 4 outputs the decision result to the translation processing unit 5. The translation processing unit 5 divides the headline at this part (hyphen immediately before "analysts"), translates each divided noun phrase, and outputs as a final translation of the headline by connecting each translated noun phrase. In this way, as shown in <Application translation>, the translation sentence of the headline becomes a more suitable expression.

As mentioned-above, in the present embodiment, the headline and the article body are respectively detected, the target word information and the noun phrase are correctly extracted, and the headline and the article body are appropriately translated. As a result, translation accuracy greatly improves. Concretely, as for the headline, by applying a translation rule for headline's exclusive use, the translation sentence of the headline becomes more natural. As for fragmental noun such as the name of a person or a company abbreviated in the headline, they can be translated as correct target word (not the abbreviation) by the phrase alignment processing for the noun phrase in the article body. As a result, translation quality of the headline improves. Furthermore, by suitably adding information not included in the headline, the target word of the headline can be easily read and understood by a subscriber. Furthermore, the target word information extracted from the retrieved similar article is utilized. As a result, the target word accuracy of the headline and the article body improves.

In the above-mentioned embodiment, an example of an English to Japanese translation was explained. However, the basic concept can be applied to translation between other languages such as Japanese to English, Germany to English, French to English, Chinese to English, Russian to English, etc. Furthermore, in the above-mentioned embodiment, extraction processing of the target word information using English-Japanese parallel corpus was explained. However, a single language corpus of the target language can be utilized. For example, Japanese article corpus is prepared for English-Japanese translation. After an English article of translation object is normally translated, a Japanese article similar to the translation result is retrieved from the Japanese article corpus by using the above-mentioned method. Then, the extraction processing of target word information is executed for the retrieved Japanese article and the English article of translation object. By using the target word information, the English article is translated again. Furthermore, as a modification of this method, in case of retrieving a Japanese article similar to the English article translation object, the target word candidate of each word in the English article is obtained by referring to an English-Japanese dictionary, and the similar Japanese article is retrieved from the corpus by using the target word candidate. This method is disclosed in the above reference (1). In this method, the English article translation object is translated only one time, and the processing can be executed at a high speed. In general, a creation of a single language corpus is easily executed in comparison with a creation of a parallel corpus. Accordingly, the method using the single language corpus is advantageous from this point.

Figure 10:
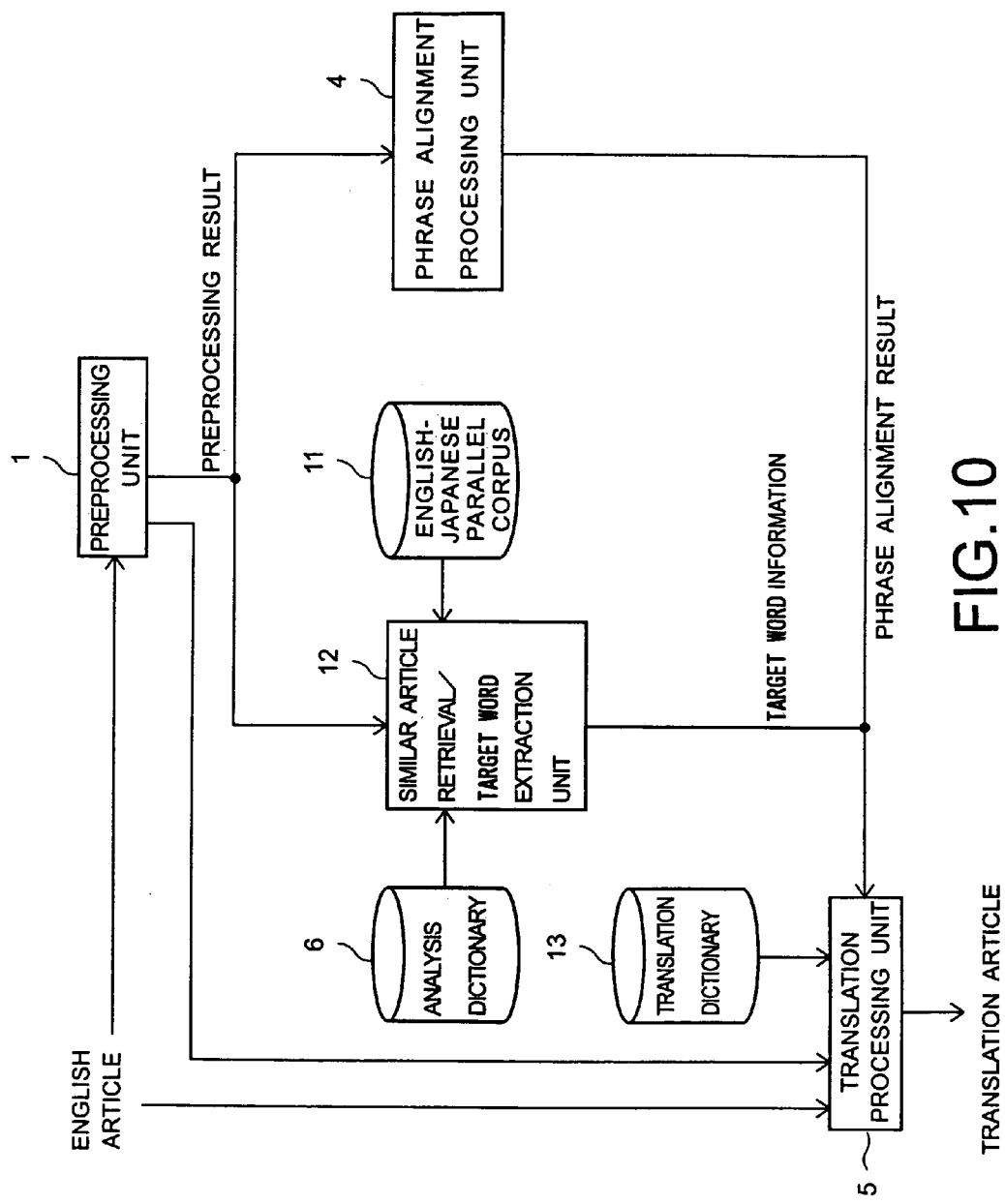
FIG. 10 is a block diagram of the translation apparatus according to another embodiment of the present invention.

FIG. 10 is a block diagram of the translation system according to another embodiment of the present invention. In FIG. 10, as for the same component element compared with FIG. 1, the same sign is assigned and explanation is omitted.

Figure 11:
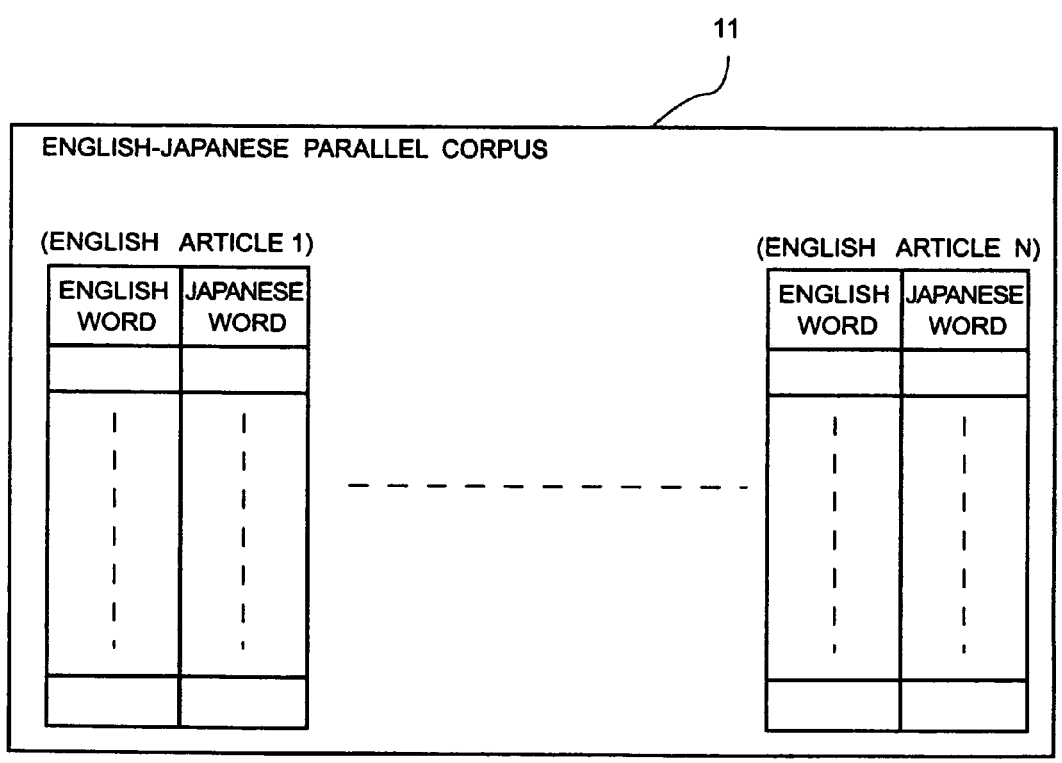
FIG. 11 is a schematic diagram of component of English-Japanese parallel corpus in FIG. 10.

In this embodiment, in comparison with FIG. 1, instead of the similar article retrieval unit 2, the English-Japanese corpus 7 and the translation dictionary 8, a similar article retrieval/target word extraction unit 12, an English-Japanese parallel corpus 11, and a translation dictionary 13 are respectively adopted. As a result, the target word information extraction unit 3 in FIG. 1 is omitted. The translation dictionary 13 is a dictionary in which Japanese-English translation dictionary is deleted from the translation dictionary 8. As a draw back of the target word information extraction algorithm in FIG. 6, a target word not registered in the translation dictionary cannot be extracted from the article. Accordingly, as for a pair of English article and Japanese article in the English-Japanese parallel corpus 11, after the target word information is extracted from the English article and the Japanese article, deletion of unsuitable target word and addition of insufficient target word are properly executed in order to modify the target word information. Then, the modified equivalent information is previously stored in the English-Japanese parallel corpus 11 in correspondence with identifier of article including the original target word. FIG. 11 is a schematic diagram of component of the English-Japanese parallel corpus in FIG. 10. As shown in FIG. 11, the target word (Japanese word) of each English word is stored in correspondence with English article ID including each English word.

In this case, the similar article retrieval/target word extraction unit 12 directly retrieves the target word information (Japanese word) of each English word corresponding to English article ID retrieved as the similar article ID. As a result, extraction processing of the target word information is not necessary.

As mentioned-above, in this embodiment, in addition to high speed processing, it is not necessary that each pair of English article and Japanese article is stored in the English-Japanese parallel corpus. Accordingly, necessary memory capacity can be greatly reduced.

A memory can be used to store instructions for performing the process described above. Such a memory can be a CD-ROM, floppy disk, hard disk, magnetic tape, semiconductor memory, and so on.

Other embodiment of the invention will be apparent to those skilled in the art from consideration of the specification and practice of the invention disclosed herein. It is intended that the specification and examples be considered as exemplary only, with the true scope and spirit of the invention being indicated by the following claims.

The invention claimed is:

1. A translation apparatus for translating article information in a first language including an article body and a related headline into a second language, comprising:
   a decision unit configured to discriminately identify the article body and the headline;
   a phrase alignment processing unit configured to respectively extract a noun phrase from the headline and a noun phrase candidate from a head sentence of the article body, to count coincident words between the noun phrase and the noun phrase candidate, and to output the noun phrase and the noun phrase candidate as a phrase alignment result if a coincidence ratio based on the counted value is above a threshold; and
   a translation unit configured to translate the article body and the headline into the second language based on the phrase alignment result.

2. The translation apparatus according to claim 1, wherein said decision unit obtains a uniform resource locator of a Web page of the article information, determines whether the Web page is registered as a news site based on the uniform resource locator, and discriminates the article body and the headline based on a decision algorithm corresponding to the news site if the Web page is registered as the news site.

3. The translation apparatus according to claim 2, wherein said decision unit discriminates the article body and the headline based on a decision algorithm corresponding to a general news page if the Web page is not registered as the news site.

4. The translation apparatus according to claim 1, wherein the coincidence ratio based on the counted value is a ratio of a number of the coincident words to a number of words of the noun phrase candidate.

5. The translation apparatus according to claim 1, wherein said phrase alignment processing unit extracts a noun phrase from the end of the headline, extracts a predetermined pattern including a noun phrase from the head sentence of the article body, and identifies the noun phrase of the headline as an information source part of the article information if the noun phrase of the headline and the noun phrase of the predetermined pattern are included in the phrase alignment result.

6. The translation apparatus according to claim 1, wherein said translation unit translates the headline of the first language into the second language by referring to a special rule for translating the headline.

7. A translation method for translating article information in a first language including an article body and a related headline into a second language, comprising:
   discriminately identifying the article body and the headline;
   respectively extracting a noun phrase from the headline and a noun phrase candidate from a head sentence of the article body;
   counting coincident words between the noun phrase and the noun phrase candidate;
   outputting the noun phrase and the noun phrase candidate as a phrase alignment result if a coincidence ratio based on the counted value is above a threshold; and
   translating the article body and the headline into the second language based on the phrase alignment result.

8. The translation method according to claim 7, further comprising:
   obtaining a uniform resource locator of a Web page of the article information;
   determining whether the Web page is registered as a news site based on the uniform resource locator; and
   discriminating the article body and the headline based on a decision algorithm corresponding to the news site if the Web page is registered as the news site.

9. The translation method according to claim 8, further comprising:
   discriminating the article body and the headline based on a decision algorithm corresponding to a general news page if the Web page is not registered as the news site.

10. The translation method according to claim 7, wherein the coincidence ratio based on the counted value is a ratio of a number of the coincident words to a number of words of the noun phrase candidate.

11. The translation method according to claim 7, further comprising:
   extracting a noun phrase from the end of the headline;
   extracting a predetermined pattern including a noun phrase from the head sentence of the article body; and
   identifying the noun phrase of the headline as an information source part of the article information if the noun phrase of the headline and the noun phrase of the predetermined pattern are included in the phrase alignment result.

12. The translation method according to claim 7, further comprising translating the headline of the first language into the second language by referring to a special rule for translating the headline.

13. A computer program product, comprising a memory code embodied in said memory for causing a computer to translate article information in a first language including an article body and a related headline into a second language, said computer readable program code having:

a first program code to discriminately identify the article body and the headline;

a second program code to respectively extract a noun phrase from the headline, and a noun phrase candidate from a head sentence of the article body;

a third program code to count coincident words between the noun phrase and the noun phrase candidate;

a fourth program code to output the noun phrase and the noun phrase candidate as a phrase alignment result if a coincidence ratio based on the counted value is above a threshold; and a fifth program code to translate the article body and the headline into the second language based on the phrase alignment result.

* * * * *